United States Patent
Nagayama et al.

[11] Patent Number: 5,854,149
[45] Date of Patent: Dec. 29, 1998

[54] PAPER-MADE STAMPABLE SHEET, LIGHT-WEIGHT STAMPABLE SHEET SHAPED BODY AND METHOD OF PRODUCING LIGHT-WEIGHT STAMPABLE SHAPED BODY

[75] Inventors: Katsuhiro Nagayama; Masami Fujimaki; Shigeru Takano; Taiji Matsumoto; Tomoshige Ono; Yukio Nagashima, all of Chiba; Syohei Masui, Kyoto; Satoru Funakoshi, Osaka; Yuji Kobayashi, Chiba; Hiroyuki Yoshitake, Chiba; Mitsuaki Sunada, Chiba, all of Japan

[73] Assignees: Kawasaki Steel Corporation Sumitomo Chemical Co., Ltd.; K-Plasheet Corporation, both of Japan

[21] Appl. No.: 737,016

[22] PCT Filed: Mar. 1, 1996

[86] PCT No.: PCT/JP96/00507

§ 371 Date: Nov. 15, 1996

§ 102(e) Date: Nov. 15, 1996

[87] PCT Pub. No.: WO96/26822

PCT Pub. Date: Sep. 6, 1996

[30] Foreign Application Priority Data

| Mar. 1, 1995 | [JP] | Japan | 7-041549 |
| Mar. 1, 1995 | [JP] | Japan | 7-041550 |
| Mar. 7, 1995 | [JP] | Japan | 7-046786 |
| Mar. 7, 1995 | [JP] | Japan | 7-046787 |
| Sep. 7, 1995 | [JP] | Japan | 7-229930 |
| Oct. 17, 1995 | [JP] | Japan | 7-268098 |

[51] Int. Cl.$^6$ ............. B32B 27/04; B29B 11/16; B29C 51/12

[52] U.S. Cl. ........... 442/394; 442/398; 428/36.1; 428/36.2; 264/113; 264/120; 264/320; 264/324; 162/146; 162/156; 162/206; 156/245

[58] Field of Search ................... 442/394, 398; 428/36.1, 36.2; 264/41, 113, 120, 320, 324; 162/123, 145, 146, 149, 156, 206; 156/245

[56] References Cited

U.S. PATENT DOCUMENTS

| 4,337,116 | 6/1982 | Foster et al. | 428/36.1 X |
| 4,670,331 | 6/1987 | Radvan | 428/303 |
| 4,957,805 | 9/1990 | Biggs et al. | 442/394 X |
| 5,409,573 | 4/1995 | Weeks | 162/145 |
| 5,436,980 | 7/1995 | Weeks et al. | 382/141 |

FOREIGN PATENT DOCUMENTS

| 0 255 315 A2 | 2/1988 | European Pat. Off. |
| 0 329 200 A2 | 8/1989 | European Pat. Off. |
| 0 341 977 A2 | 11/1989 | European Pat. Off. |
| 0 476 538 A1 | 3/1992 | European Pat. Off. |
| 4400894 A1 | 7/1995 | Germany |
| 60-179234 | 9/1985 | Japan |
| 62-161529 | 7/1987 | Japan |

(List continued on next page.)

Primary Examiner—Daniel Zirker
Attorney, Agent, or Firm—Austin R. Miller

[57] ABSTRACT

As a paper-made stampable sheet having a high rigidity and, if necessary, improved adhesiveness and non-permeability and a light weight stampable sheet shaped body made from this sheet and a method of producing the same, there are proposed a paper-made stampable sheet obtained by papermaking a mixture of thermoplastic resin and reinforcing fibers to obtain a sheet-like web, piling a thermoplastic resin film of a single layer or multi layer or an organic fiber nonwoven fabric having at least one excellent property selected from rigidity, non-permeability and adhesiveness on at least one-side surface of the sheet-like web in accordance with use purpose, compressing them under heating above a melting point of the thermoplastic resin constituting the web, cooling and solidifying at a compressed state as well as a light weight stampable sheet shaped body made from this sheet and a method of producing the same.

34 Claims, 5 Drawing Sheets

FOREIGN PATENT DOCUMENTS

| | | |
|---|---|---|
| 7-102650 | 7/1991 | Japan . |
| 3-52342 | 8/1991 | Japan . |
| 4-331137 | 11/1992 | Japan . |
| 5-16277 | 1/1993 | Japan . |
| 6-344483 | 12/1994 | Japan . |
| 7-1628 | 1/1995 | Japan . |
| 7-16933 | 1/1995 | Japan . |
| 7-9462 | 1/1995 | Japan . |

CONCAVE PORTION

PAPER-MADE STAMPABLE SHEET, LIGHT-WEIGHT STAMPABLE SHEET SHAPED BODY AND METHOD OF PRODUCING LIGHT-WEIGHT STAMPABLE SHAPED BODY

TECHNICAL FIELD

This invention relates to a paper-made stampable sheet and a light-weight stampable sheet shaped body produced from this sheet and a method of producing the same. Particularly, the light-weight stampable sheet shaped body lined with a decorative skin according to the invention is high in the rigidity and improves an adhesiveness or a non-permeability between a substrate and a skin, if necessary, and is usable in wide fields such as interior member for automobile, household electrical appliances, building materials and the like.

BACKGROUND ART

Recently, the stampable sheet consisting essentially of reinforcing fibers and thermoplastic resin has been noticed as an alternative product for metal worked product because it can be shaped into a complicated form and the resulting shaped body is high in the strength and light in the weight.

Such a stampable sheet is mainly produced by the following two methods. That is, there are:

1. Laminating process

A plurality of strand reinforcing fibers are entangled with each other by piercing a needle to form a mat of the strand reinforcing fibers and a thermoplastic resin is laminated thereonto, which are heated and pressed and cooled at a compressed state to form a solidified sheet or so-called laminated stampable sheet;

2. Paper-making process

A dispersion of particulate thermoplastic resin and reinforcing fibers dispersed in an aqueous surfactant solution containing fine bubbles is made on a porous support to prepare a sheet-like web (deposit) and then the web is heated to a temperature of not lower than a melting point of the thermoplastic resin but lower than a decomposition point thereof at once, pressed and cooled at a compressed state to form a solidified sheet or so-called paper-made stampable sheet.

The stampable sheet obtained by such a method contains the reinforcing fibers substantially opened to monofilament state, so that when the sheet is again heated to a temperature of not lower than the melting point of the resin but lower than the decomposition point thereof, the resin is molten and hence the fibers restrained by the resin create stress mitigation (spring-back) to form an expansion sheet expanded to not less than several times of original thickness. Then, the expansion sheet is subjected to compression forming, vacuum forming, pressure forming or the like, whereby it is made possible to conduct expansion forming of a light weight stampable sheet shaped body having a given shape. That is, the porous light weight stampable sheet shaped body having a density smaller than that of the stampable sheet and a high face rigidity can be obtained by adjusting a mold clearance at the completion of the expansion forming so as to be larger than the thickness of the stampable sheet before the heating.

When the above laminated stampable sheet is used as a starting material for the expansion forming, the expandability at the heating is poor and hence the sufficient expansion forming can not be conducted. For this end, the paper-made stampable sheet is usually used as a starting material for the above expansion forming.

Moreover, when the light weight stampable sheet shaped body is used in a part requiring the decorativeness, it is general that the expansion sheet is laminated to and integrally united with a skin for decoration during the forming to form a light weight stampable sheet shaped body.

As to rigidity

The light weight stampable sheet shaped body and the method of producing the same are proposed in, for example, JPA-60-179234 and JP-A-62-161529. However, it can not be said that the light weight stampable sheet shaped body obtained by the paper-making process according to these proposals is always excellent in rigidity. That is, the expansion material is generally low in rigidity, so that when the light weight stampable sheet shaped body made from a high expanded material having a small basis weight is incorporated into a vehicle body as an interior member for the automobile, it is bent and hence breaks. If the shaped body is not broken, there is a problem that a crease forms in the skin at the bent portion.

On the contrary, there is widely known a light weight composite body formed by sticking a material having a high rigidity onto a surface of the light weight material to render a sandwich structural body for enhancing the rigidity of the material. According to such a light weight composite body, the improvement of the rigidity through the material laminated on the surface layer and the weight reduction through the light weight core material can simultaneously be attained.

Such a light weight composite body of the sandwich structure is applied even to the field of the interior member of automobiles. As a technique for solving the above problem, there has hitherto been proposed a laminated body of sandwich structure formed by using a thermoplastic resin foamed body as a light weight core material and laminating a resin sheet as a surface layer material having a high rigidity onto the surface of the core material. For example, there are proposed:

1. A laminated body formed by using a foamed sheet of polystyrene resin as a light weight core material and laminating a resin reinforced sheet obtained by impregnating inorganic fibers and an emulsion of styrene resin with an organic fiber nonwoven fabric onto each surface of the sheet as described in JP-B-3-52342;
2. A laminated body formed by using a foamed sheet of resin comprised of polyphenylene ether and styrene as a light weight core material and laminating a resin sheet comprised of polyphenylene ether and styrene onto each surface of the sheet as described in JP-A-6-344483;
3. A laminated body formed by using a foamed sheet of crosslinking-type thermoplastic resin as a light weight core material and laminating a composite sheet of thermoplastic resin film and glass paper onto the surface of the sheet as described in JP-A-7-1628;
4. A laminated body formed by using a glass fiber-reinforced thermoplastic resin foamed sheet as a light weight core material and laminating a two-dimensional oriented glass fiber-reinforced thermoplastic resin foamed sheet onto the surface of the sheet as described in JP-A-7-9462 and JP-A-7-16933.

However, all of the techniques proposed in the above items ①–③ use the foamed body of the resin itself not reinforced as the core material, so that there is a problem that it is difficult to use them in applications strictly requiring dimensional stability in shaping. That is:

1. The laminated body described in JP-B-3-52342 is difficult to use in applications strictly requiring heat resistance and dimensional stability in shaping because the rigidity of the material is not so high and the foamed sheet of the polystyrene resin is used as a core material;

2. The laminated body described in JP-A-6-344483 is excellent in heat resistance but is insufficient in dimensional stability in shaping as in item 1, so that it is difficult to use in applications strictly requiring dimensional stability in shaping;

3. The laminated body described in JP-A-7-1628 is high in rigidity and excellent in heat resistance and dimensional stability in shaping as compared with items 1, 2, but it is still difficult to use in applications strictly requiring dimensional stability in shaping because the foamed body of the resin itself is used as a core material.

Further, the laminated bodies described in JP-A-7-9462 and JP-A-7-16933 of the item 4 are high in rigidity and excellent in heat resistance and dimensional stability in shaping, but use the two-dimensional glass fiber-reinforced thermoplastic resin foamed sheet. Therefore, they have drawbacks in that the cost becomes uneconomically higher and the production steps become complicated.

Adhesiveness between substrate and skin and non-permeability

When the light weight stampable sheet shaped body provided with skin for decoration is used as an interior member for automobiles, it is necessary and inevitable to have a high adhesiveness between substrate (core material) and skin, and highly impermeable of skin laminated product.

However, the light weight stampable sheet shaped body is generally produced by integrally sticking the expansion sheet and the decorative skin through simple press-forming under heat without using an adhesive. In case of the simple skin sticking without an adhesive layer between the substrate sheet and skin, sufficient adhesion strength can not be expected between the substrate and the skin. This is so because the contact area between the expansion sheet, having a large porosity, and the skin is small, and also the adhesion component in the sticking is only the thermoplastic resin existing on the surface layer of the expansion sheet. Furthermore, the light weight stampable sheet shaped body is shaped maintaining the expanded state of the expansion sheet, so that the shaping pressure in the sticking is small and hence the penetration (supplement) of resin component from the interior of the expansion sheet to the surface thereof is less.

On the contrary, there have been proposed light weight stampable sheet shaped bodies formed by integrally uniting the substrate and the skin through an adhesive. For example, 1. A technique for improving the adhesiveness between the substrate and the skin by pressure-shaping at a state of inserting a hot-melt type adhesive film between the substrate and the skin in JP-A-5-16274;

2. A technique for not only improving the adhesiveness between the substrate and the skin, but also preventing resin from exuding toward the skin surface by pressure-shaping at a state of inserting an inorganic filler containing thermoplastic resin between the substrate and the skin in JP-A-4-331137;

3. A technique for improving the adhesiveness between the substrate and skin and the appearance of the skin side by pressure-shaping the skin laminated with a thermoplastic resin porous sheet onto the expansion sheet in JP-A-5-16277;

4. A technique for producing a light weight composite body having an excellent skin adhesiveness by successively laminating thermoplastic resin film A to thermoplastic resin film B (having a melt viscosity higher than that of the film A at the same temperature) to adhesible thermoplastic resin C, on at least one-side surface of nonwoven mat mainly composed of inorganic fibers; melting under heating; impregnating the molten resin into the nonwoven mat under compression; releasing compression force to recover the thickness; and then cooling to conduct solidification in (JP-B-7-102650).

However, the techniques described in the above proposals have the following problems:

1. According to the technique described in JP-A-5-16274, the adhesive film becomes large in fluidity at the pressure-shaping stage and penetrates into gaps in the porous expansion sheet substrate, and hence does not remain between the substrate and the skin. Therefore, the adhesiveness between substrate and skin is insufficient and the impermeability is poor. That is, material having poor impermeability may cause problems in that the required amount of pressure loss cannot be ensured during the adhesion-shaping (particularly vacuum shaping), dropwise condensation is generated on components to be provided with a skin stuck product promoting corrosion of this component, the skin stuck product acts as a filter to contaminate the skin, and the like. In the light weight stampable sheet shaped body useful as interior components for automobiles such as ceiling components, door trim components or the like, it is therefore important to improve the impermeability.

2. According to the technique described in JP-A-4-331137, the poor appearance (exudation of resin) and the adhesiveness can be improved to a certain level by adjusting the amount of the inorganic filler, but it is difficult to simultaneously improve the adhesiveness and the impermeability.

3. According to the technique described in JP-A-5-16277, the fluidity of the thermoplastic resin porous sheet is poor and the contact area between the expansion sheet substrate and the porous sheet is small, so that the anchor effect of the porous sheet is not sufficiently developed and the adhesiveness between the substrate and the skin is poor.

4. According to the technique described in JP-B-7-102650, the adhesiveness between the substrate and the skin can be improved to a certain level, but it is difficult to simultaneously improve the adhesiveness and the impermeability.

Method of Producing light weight stampable sheet shaped bodies provided with a skin JP-A-5-16274 proposes a method of producing light weight stampable sheet shaped bodies provided with skins by shaping so the substrate portion is rendered 5–75% porous through a paper-making process. However, the technique of this proposal is not a technique improving rigidity, adhesion between the substrate and skin, and impermeability.

Light weight stampable sheet shaped bodies as a shock absorbing parts

The shock absorbing parts are well-known and widely used and particularly as applied to door trim as the interior components of automobiles that improve shock absorption for coping with side collisions. A known structure for such a door trim is a substrate such as a thermoplastic resin shaped body provided at its design face side with a decorative skin, and at a non-design face side with a shock absorbing body of block or rib structure.

However, such a door trim is necessary to simultaneously satisfy the rigidity and shock absorbing property as interior components for automobiles. The former structure has a problem that the thickness of the substrate in the interior component increases the weight. Further, the latter structure is superior in the light weight to the former because the rib structure can integrally be united with the substrate resin portion. But the reduction of the weight is not yet sufficient, while there are many restrictions on the rib form in the shaped face for the integral uniting, hence, the reduction to light weight and the shock absorbing property can not simultaneously be satisfied.

It is an object of the invention to solve various problems of the above conventional techniques and to develop paper-made stampable sheets exhibiting a high rigidity and possessing the adhesiveness and non-permeability.

It is another object of the invention to provide light weight stampable sheet shaped bodies exhibiting a rigidity enough to be used in applications strictly requiring the dimensional stability in the shaping.

It is the other object of the invention to provide light weight stampable sheet shaped bodies exhibiting a high rigidity and having an excellent adhesiveness between substrate and skin and an improved non-permeability.

It is a further object of the invention to provide light weight stampable sheet shaped bodies having an excellent shock absorbing property in addition to the above properties.

It is a still further object of the invention to provide a technique for advantageously producing the above light weight stampable sheet shaped body.

DISCLOSURE OF THE INVENTION

The inventors have made various studies in order to achieve the above objects. As a result, matters as mentioned later have been knowledged and tie invention has been accomplished.

1. It is discovered that by using fiber-shaped thermoplastic resin as a thermoplastic resin constituting the paper-made stampable sheet reduces gaps between the reinforcing fibers to improving rigidity, whereby the mechanical properties of the light weight stampable sheet shaped body are largely improved. Particularly, when a modified resin fibers are used as the thermoplastic resin, the fiber-shaped resins are entangled with each other even in the gap between the reinforcing fibers. Also, the resin containing a modifying component may be effectively added to a contact point between the reinforcing fibers, whereby higher mechanical properties are obtained as compared with the case of using the particulate thermoplastic resin.

The invention is based on the above knowledge and is a paper-made stampable sheet being a solidified sheet obtained by paper-making a mixture of thermoplastic resin and reinforcing fibers to obtain a sheet-like web, heating the web above a melting point of the thermoplastic resin, compressing and cooling at a compressed state. The paper-made stampable sheet is characterized in that the thermoplastic resin constituting the web is a fiber-shaped thermoplastic resin or a mixture of particulate thermoplastic resin and fiber-shaped thermoplastic resin, and a ratio of the fiber-shaped thermoplastic resin occupied in the thermoplastic resin is not less than 5 parts by weight based on 100 parts by weight of total thermoplastic resin. The invention is also a light weight stampable sheet shaped body made from this sheet.

2. It has been found that at least one surface of a web may be laminated with a resin film having the same or similar structure as that of the thermoplastic resin constituting the web and a melt viscosity equal to or more than that of the thermoplastic resin in the shaping under heating compression to suppress the penetration of the resin film into the web in the heating and compression and form a laminate of a sandwich structure, whereby a paper-made stampable sheet having a high rigidity and an excellent non-permeability is obtained. This paper-made stampable sheet is formed so as to retain a dense layer in the interior of the substrate surface layer in the shaped body even in the expansion shaping, and the dense layer serves as a rigidity improving layer and a non-permeable layer, whereby a light weight stampable sheet shaped body having a high rigidity and an excellent non-permeability can be formed. Furthermore, the film layer forms a smooth surface, which facilitates the adhesion in case of sticking a skin having a hot melt layer. On the other hand, in case of sticking a skin having no adhesion layer such as hot melt layer or the like, it has been found that the adhesiveness to the skin can be improved by further laminating a film having a low melting point.

3. Further, it has been found that the paper-made stampable sheet having a non-permeability higher than that of the above item (2) is obtained by laminating two films of a thermoplastic resin film being same or similar to the thermoplastic resin constituting the web and a high melting point resin film forming a non-permeable layer on at least one-side surface of the web. Moreover, the above film layers form the smooth surface as in item (2), so that it facilitates the adhesion for sticking the skin provided with the hot melt layer. On the other hand, in case of sticking the skin not provided with an adhesion layer such as hot melt layer or the like, it has been found that the adhesiveness to the skin can be improved by further laminating a film of a low melting point.

The invention based on the above items (2) and (3) lies in a paper-made stampable sheet obtained by laminating a thermoplastic resin film of a single layer or multi layer having at least one excellent property selected from rigidity, non-permeability and adhesiveness on at least one-side surface of a sheet-like web paper-made from a mixture of a thermoplastic resin and reinforcing fibers, compressing under heating above a melting point of the thermoplastic resin constituting the web, cooling and solidifying at the compressed state as well as a light weight stampable sheet shaped body produced from this sheet.

In this case, it is preferable that the thermoplastic resin film is a single layer film A made from a resin having the same or similar structure as that of the thermoplastic resin constituting the web and a melt viscosity equal to or more than that of the thermoplastic resin in the heating and shaping under compression.

It is desirable that the thermoplastic resin film is a two-layer film B made from a first resin layer having the same or similar structure as that of the thermoplastic resin constituting the web and a melt viscosity equal to or more than that of the thermoplastic resin in the heating and shaping under compression, and a second resin layer made from a resin having a melting point lower than that of the thermoplastic resin constituting the web, onto which the first resin layer is laminated, so as to locate at the side of the web.

It is desirable that the thermoplastic resin film is a two-layer film C made from a first resin layer having the same or similar structure as that of the thermoplastic resin constituting the web and a second resin layer made from a resin having a melting point higher than that of the thermoplastic resin constituting the web in which the first resin layer is laminated, so as to locate at the side of the web.

It is desirable that the thermoplastic resin film is a three-layer film D made from a first resin layer having the same or similar structure as that of the thermoplastic resin constituting the web, a second resin layer made from a resin having a melting point higher than that of the thermoplastic resin constituting the web and a third resin layer having a melting point lower than that of the thermoplastic resin constituting the web, onto which the first resin layer is laminated so as to locate at the side of the web.

4. It has been found that a paper-made stampable sheet having a high rigidity is obtained by laminating at least one side surface of the web with an organic fiber nonwoven fabric having a melting point higher than that of the thermoplastic resin constituting the web. Further, it has been found that the paper-made stampable sheet having improved rigidity, adhesiveness and non-permeability is obtained by placing the above organic nonwoven fabric between the film of the above items (2), (3) and the web or on the outermost film layer to suppress the penetration of the first resin layer constituting the film into the web. In this paper-made stampable sheet, the dense layer made from the organic fiber nonwoven fabric and the film is formed on the surface layer of the substrate in the shaped body even in the expansion shaping, so that there can be formed a light weight stampable sheet shaped body having a high rigidity non-permeability, and excellent adhesiveness between substrate and skin.

The invention based on the above knowledge lies in a paper-made stampable sheet formed by laminating at least one side surface of a sheet-like web, paper-made from a mixture of thermoplastic resin and reinforcing fibers with organic fiber nonwoven fabric having a melting point higher than that of the thermoplastic resin constituting the web, heating and compressing above a melting point of the thermoplastic resin constituting the web and cooling and solidifying at the compressed state as well as a light weight stampable sheet shaped body made from this sheet.

In this case, it is desirable that the organic fiber nonwoven fabric is interposed between the sheet-like web and the thermoplastic resin film.

It is desirable that a single layer film E made from a resin having the same or similar structure as that of the thermoplastic resin constituting the web is placed between the sheet-like web and the organic fiber nonwoven fabric.

5. The invention provides a light weight stampable sheet shaped body obtained by placing a shock absorbing component on at least a part of a non-design face (not covered with the skin) of a skin-stuck porous body as a shock absorbing member giving a shock absorbability to the aforementioned light weight stampable sheet shaped body.

6. The invention proposes a method wherein a paper-made stampable sheet expanded by heating and a skin are supplied to a pair of open male and female molds so as to laminate them, the molds are clamped and compressed, rendering the expansion thickness of the expanded paper-made stampable sheet between 40–80%, integrally uniting the stampable sheet and the skin. The method advantageously produces the above-mentioned light weight stampable sheet shaped body.

Figure 1:
FIG. 1 to FIG. 6 are outline views illustrating a sectional structure of an embodiment of the light weight stampable sheet shaped body according to the invention.

In these figures, numeral 1 is a substrate (core material), numeral 2 a skin, numeral 3 a thermoplastic resin film, numeral 4 an organic fiber nonwoven fabric, numeral 5 a female mold, numeral 6 a male mold, numeral 7 a clamp frame for the skin, numeral 8 a clamp frame for the paper-made stampable sheet, numeral 9 a sliding device of the clamp frame for the paper-made stampable sheet, numeral 10 a paper-made stampable sheet (heating sheet) heated before the expansion shaping, numeral 11 a stopper, numeral 12 a paper-made stampable sheet (expansion sheet) after the expansion shaping, numeral 13 a thermoplastic resin layer (molten resin layer) melted by heat of the heating sheet, numeral 14 a thermoplastic resin layer not melted by heat of the heating sheet, numeral 15 a thermoplastic resin layer having a melting point lower than that of the resin 13, and numeral 16 a shock absorbing body.

BEST MODE FOR CARRYING OUT THE INVENTION

A first feature of the paper-made stampable sheet according to the invention lies in that fiber-shaped thermoplastic resin is used as a thermoplastic resin constituting a web.

Thus, the rigidity of the paper-made stampable sheet as well as the light weight stampable sheet shaped body made from this sheet can be improved. According to the invention, therefore, there can be provided the light weight stampable sheet shaped body having a rigidity sufficient to be used in applications strictly requiring dimensional stability in the shaping.

A second feature of the paper-made stampable sheet according to the invention lies in that a resin film of single layer or multi layer having at least one excellent property selected from rigidity, non-permeability and adhesiveness is laminated on the paper-made sheet made from the thermoplastic resin and reinforcing fibers.

Thus, when the above paper-made stampable sheet is heated and shaped under pressure (expansion shaped) by laminating a decorative skin, if necessary, a light weight stampable sheet shaped body having at least one excellent property selected from the rigidity, non-permeability and adhesiveness between substrate and skin can be obtained as compared with the conventional light weight stampable sheet shaped body provided with a single adhesion layer.

A third feature of the paper-made stampable sheet according to the invention lies in that the organic fiber nonwoven fabric having a melting point higher than that of the thermoplastic resin constituting the web is laminated on the paper-made sheet made from the thermoplastic resin and reinforcing fibers at a given position.

Thus, the organic fiber nonwoven fabric acts as a non-permeable layer for the paper-made stampable sheet or light weight stampable sheet shaped body and contributes to improve the non-permeability.

A feature of the light weight stampable sheet shaped body according to the invention lies in that the above paper-made stampable sheet is used as a starting material.

Thus, the adhesiveness between substrate and skin is excellent irrespective of the adhesiveness of the skin, and there can stably be provided light weight stampable sheet shaped body with a skin ensuring the complete non-permeability in case of laminating the film.

Another feature of the light weight stampable sheet shaped body according to the invention lies in that a shock absorbing body is disposed on at least a part of a non-design face not provided with the skin to form a shock absorbing member.

Thus, the light weight stampable sheet shaped body according to the invention can be used in applications requiring the light weight and shock absorbability as an interior member for automobile such as door trim or the like.

The structures of the paper-made stampable sheet and light weight stampable sheet shaped body according to the invention will be described in detail below.

As to reinforcing fibers

As the reinforcing fiber constituting the substrate according to the invention, use may be made of inorganic fibers such as glass fiber, carbon fiber, boron fiber, metallic fiber and the like; or organic fibers such as aramide fiber, polyester fiber, polyamide fiber, cellulose fiber and the like. Particularly, it is desirable to use the glass fiber because the high reinforcing effect is obtained with a low cost.

The fiber length of the reinforcing fiber is desirable to be a range of 5–30 mm, preferably 10–26 mm from a viewpoint that the reinforcing effect is excellent and the shapability in the paper-making is ensured. When the fiber length is less than 5 mm, the sufficient reinforcing effect is not obtained and the breakage is apt to be caused at the paper-making step. While, when the fiber length exceeds 30 mm, the reinforcing fibers are not sufficiently opened at the paper-making step and hence the expansion of the shaped body becomes nonuniform and the spring back effect is small. As a result, the expandability of the shaped body lowers and at the same time the shapability in the shaping is degraded.

The fiber size of the reinforcing fiber is desirable to be a range of 5–30 $\mu$m, preferably 10–25 $\mu$m from a viewpoint of the reinforcing effect of the fibers and the ensurement of expansion effect. When the fiber size is less than 5 $\mu$m, the sufficient expansion magnification is not obtained, while when it exceeds 30 $\mu$m, the sufficient reinforcing effect is not obtained.

Further, when the reinforcing fibers are two kinds of glass fibers having different fiber sizes, if the amount of small size fiber added is $W1$ wt % and the amount of large size fiber added is $W2$ wt %, it is desirable that the value of $W2/(W1+W2)$ is 0.3–0.7. If the amount of large size fiber added is too much, the glass fiber sticks cause pain during handling, and also hanging down (or so-called drawdown) is caused to undesirably contact with a heater or the like when both ends of the sheet are fixed by means of clamp and heated in the shaping. On the other hand, if the amount of small size fiber added is too much, the rigidity of the glass fiber itself is small and the expandability of the paper-made stampable sheet lowers. Therefore, the value of $W2/(W1+W2)$ is desirable to be a range of 0.3–0.7 in order to make it possible to produce the light weight stampable sheet shaped body having excellent expandability and handling property.

These reinforcing fibers are subjected to a surface treatment with a coupling agent or a treatment with greige goods, if necessary.

Particularly, a treatment with a silane coupling agent is carried out in order to improve the wettability and adhesiveness between the reinforcing fiber and the thermoplastic resin. As the silane coupling agent, use may preferably made of coupling agents such as vinylsilanes, aminosilanes, epoxysilanes, methacrylsilanes, chlorosilanes and mercaptosilanes. The surface treatment of the reinforcing fibers with such a silane coupling agent is carried out by the conventionally known methods, e.g. a method wherein a solution of silane coupling agent is sprayed while agitating the reinforcing fibers, a method wherein the reinforcing fibers are immersed in the solution of the coupling agent and the like. Moreover, the treating amount of the silane coupling agent is desirable to be a range of 0.001–0.3 wt %, preferably 0.005–0.2 wt % to the reinforcing fibers. When the treating amount is less than 0.001 wt %, the improvement of the strength is small.

Furthermore, it is desirable that the reinforcing fibers are opened into single fibers in order to improve the rigidity and expandability of the paper-made stampable sheet. For this purpose, the reinforcing fibers are subjected to a treatment with water-soluble greige goods, if necessary. As the greige goods, there are polyethylene oxide, polyvinyl alcohol and the like. The treating amount of the greige goods is desirable to be a range of 0.03–0.3 wt %, preferably 0.05–0.2 wt % to the reinforcing fibers. When the treating amount exceeds 0.3 wt %, it is difficult to open the fibers at the paper-making step.

As to thermoplastic resin

As the thermoplastic resin constituting the substrate according to the invention, use may be made of polyolefinic resins such as polyethylene, polypropylene and the like; polystyrene, polyvinyl chloride, polyethylene terephthalate, polycarbonate, polyamide, polyacetal, copolymers composed mainly of these resins (e.g. ethylene-vinyl chloride copolymer, ethylene-vinyl acetate copolymer, styrenebutadiene-acrylonitrile copolymer and the like) or graft polymer thereof; thermoplastic elastomers such as EPM, EPDM and the like; polymer alloys and a blend of these resins. Among them, the polyolefinic resins such as polyethylene, polypropylene and the like are preferable, and the use of polypropylene is most favorable.

The weight mean molecular weight (hereinafter abbreviated as "Mw" simply) of the thermoplastic resin is desirable to be a range of 50,000–700,000. When Mw is less than 50,000, the melt viscosity is low and the wettability and adhesiveness to the reinforcing fibers are improved but the resin becomes brittle and the mechanical properties of the paper-made and shaped fiber reinforced thermoplastic resin substrate lower. While, when Mw exceeds 700,000, the fluidity in the paper-making lowers and the immersionability and wettability to contact point of the reinforcing fibers are degraded and hence the mechanical properties of the substrate lower.

As the shape of the thermoplastic resin, use may be made of particulate, flake, fiber and the like. Preferably, in case of particulate form, it is desirable to use resin particles having a particle size of 50–2000 µm. When the resin particle size is less than 50 µm, it is apt to cause trouble such as biting into the device and the like in the production of the web, while when the resin particle size exceeds 2000 pm, it is difficult to obtain the fiber reinforced thermoplastic resin substrate in which the reinforcing fibers are uniformly dispersed into the resin.

The thermoplastic resin may be used together with a resin modified with various compounds such as acid, epoxy and the like in order to improve the adhesiveness between the resin and the reinforcing fiber. For example, in case of polypropylene, it may be modified with maleic acid, maleic anhydride, acrylic acid or the like, and it is favorable that a modifying group is acid anhydride group or carboxyl group.

The modified resin is desirable to have mw of 20,000–200,000. When Mw is less than 20,000, the melt viscosity is low and the wettability and adhesiveness to the reinforcing fibers are improved but the resin becomes brittle and the mechanical properties of the paper-made and shaped fiber reinforced thermoplastic resin substrate lower. While, when Mw exceeds 200,000, the fluidity in the paper-making lowers and the immersionability and wettability to contact point of the reinforcing fibers are degraded and hence the mechanical properties of the substrate lower.

In the modified resin, the amount of the modifying group is desirable to be a range of 0.02–3.0 wt % (100×weight of modifying group/weight of thermoplastic resin), preferably 0.05–2.0 wt %. When the amount of the modifying group is less than 0.02 wt %, the reaction to the silane coupling agent is insufficient and the improvement of the strength is small. While, when it exceeds 3.0 wt %, there are caused drawbacks such as brittleness of the thermoplastic resin, coloration of the sheet and the like. Moreover, when the thermoplastic resin is used together with the above modified resin, the fiber reinforced thermoplastic resin substrate may be produced by laminating and shaping webs each made from respective resin, or the fiber reinforced thermoplastic resin substrate may be produced by previously melt-kneading these resins in an extruder or the like and then pulverizing, or paper-making one of the resins coated with the other resin.

In the paper-made stampable sheet and light weight stampable sheet shaped body according to the invention, the mechanical strength is largely improved by melting and integrally uniting the particulate thermoplastic resin and the fiber-shaped thermoplastic resin. Especially, it is desirable that the fiber-shaped thermoplastic resin among the thermoplastic resins is a resin having a structure same as or similar to that of the particulate thermoplastic resin. For example, in case of using particulate and fiber-shaped thermoplastic resins, when polypropylene is used as the particulate thermoplastic resin, it is desirable that the fiber-shaped thermoplastic resin is the same polypropylene or has a structure similar to that of the polypropylene or a copolymer composed mainly of propylene and other different monomer or a modified resin in which a terminal group or a part of side chain in polypropylene is substituted with another functional group (e.g. COOH group).

In case of a mixture of unmodified fiber-shaped thermoplastic resin and modified particulate thermoplastic resin, higher properties are obtained by optimizing the substrate strength and the amount of modified resin. When the fiber-shaped thermoplastic resin is a modified polypropylene, it can be subjected to the same treatment as in the particulate thermoplastic resin.

Among the thermoplastic resins, the fiber length of the fiber-shaped thermoplastic resin is desirable to be 5–50 mm. When the fiber length is too short, the fibers are apt fall out of the web at the paper-making step. On the other hand, when the fiber length is too long, the fiber-shaped thermoplastic resin is not sufficiently opened at the paper-making step and hence a non-uniform paper-made stampable sheet is obtained. Further, the fiber size is desirable to be 5–30 µm, preferably 10–25 µm. When the fiber size is too small, the suction resistance becomes large at the paper-making step, which results in the production trouble, while when the fiber size is too large, the density of the structure of the resulting paper-made stampable sheet is small.

As to compounding ratio of reinforcing fibers and thermoplastic resin

In the invention, it is desirable that the compounding ratio of the reinforcing fibers and thermoplastic resin constituting the substrate is within a range of 10/90–70/30 as a weight ratio (fiber/resin). When the compounding ratio of the reinforcing fibers (content) is less than 10 wt %, the sufficient reinforcing effect through the reinforcing fibers can not be expected, while when the compounding ratio of the reinforcing fibers (content) exceeds 70 wt %, the thermoplastic resin as a binder component is lacking in the expansion and it is difficult to uniformly impregnate the resin into a contact point between the reinforcing fibers and hence the strength lowers.

As to organic fiber nonwoven fabric

As the organic fiber nonwoven fabric used in the invention, mention may be made of fabrics made by dry and wet processes, spunbond obtained melt-spinning the resin and directly rendering into nonwoven fabric and the like. As the fiber constituting the nonwoven fabric, use may be made of melt-spun products from polyolefinic resins such as polyethylene, polypropylene and the like; resins such as polystyrene, polyvinyl chloride, polyethylene terephthalate, polycarbonate, polyacetal and the like; copolymers composed mainly of these resins (e.g. ethylene-vinyl chloride copolymer, ethylene-vinyl acetate copolymer, styrenebutadiene-acrylonitrile copolymer and the like) and grafted products thereof; thermoplastic elastomers such as EPM, EPDM and the like; polymer alloys or a blend of these resins; thermosetting resin fibers such as phenol and the like; natural fibers such as pulp, cotton and the like; and a blend of these fibers. Especially, when polypropylene is used as the thermoplastic resin constituting the substrate, it is favorable to use an organic fiber nonwoven fabric made from a resin not melting within a pressure shaping temperature range of web of 190°–210° C. (melting point is higher than 10° C. of that of polypropylene) such as polyester resin or polyamide resin.

The organic fiber nonwoven fabric is desirable to be used in an amount of 10–100 g/cm². When the amount is less than 10 g/cm², the effect of improving the rigidity is small, while when it exceeds 100 g/CM², the amount of thermoplastic resin for sufficiently wetting the inside of the nonwoven fabric becomes too large and the weight of the stampable sheet shaped body increases.

As to the skin

The skin for decoration the light weight stampable sheet shaped body according to the invention is properly selected in accordance with various purposes such as applications of surface decoration, non-permeability, cushionability, heat insulation and the like to the light weight stampable sheet shaped body as a product. It is required to have a heat resistance for preventing the melting or breaking through the thermoplastic resin of the heated paper-made stampable sheet at the shaping step.

As the skin, use may be made of woven fabrics made from natural and synthetic fibers as a starting material, organic fiber nonwoven fabric after needle punching or the like, raised fabric, knitted goods, flocked fabric and the like. Particularly, thermoplastic resin sheets of PVC (polyvinyl chloride), TPO (thermoplastic olefin), thermoplastic polyester, elastomer or the like, and laminates of this sheet with base fabric or resin foamed body such as polypropylene, polyethylene, polyvinyl chloride, polyurethane or the like; or the above decorative skins themselves, and stuck products with a backing material thereof or laminate thereof with a resin foamed body such as polypropylene, polyethylene, polyvinyl chloride, polyurethane or the like are used in the application for the interior of the automobile. Further, there may be used an assembly of the skin and a hot melt. In case of using the skin provided with the hot melt, it is desirable that a hot melt having good affinity and adhesiveness with the following film resin component to be used is selected from hot melts such as polyamide, modified polyolefin, urethane and polyolefin. Furthermore, the surface of these skins may be subjected to the formation of uneven pattern such as emboss or the like or the printing.

As to the structure of the film

The thermoplastic resin film constituting the paper-made stampable sheet or light weight stampable sheet shaped body according to the invention is constructed with films A, B, C, D, E.

1. Film A: a single layer film made from a resin having the same or similar structure as that of the thermoplastic resin constituting the web and a melt viscosity equal to or more than that of the thermoplastic resin in the heating and shaping under compression.

The film A is locally impregnated into the web in the heating and compression to form a dense layer at the surface of the shaped body to thereby render a laminated sandwich structure and hence serves to improve the rigidity and non-permeability of the light weight stampable sheet shaped body. Furthermore, the film A is smooth the skin side, so that the adhesion to the hot melt layer is facilitated in the sticking of the skin. That is, the film A is good in the adhesiveness to the thermoplastic resin constituting the web and is locally impregnated in the web in the heating and compression, so that it is a single layer film made from a resin having the same or similar structure as that of the thermoplastic resin constituting the web and a melt viscosity equal to or more than that of the thermoplastic resin in the heating and shaping under compression.

In this case, the same structure means that the same resins polymerization amount or molecular weight. On the other hand, the similar structure means that the resins are similar in the basic structure. For example, polypropylene and polyethylene are polyolefinic resins and are similar to each other in the structure. Furthermore, the resin of similar structure includes copolymers, modified products and the like.

In the invention, there is mentioned a method of increasing the molecular weight, a method of blending with the other resin (e.g. blend of polypropylene with a low-density polyethylene), or a method of filling an inorganic filler such as calcium carbonate, titanium oxide, mica, carbon black, magnesium silicate or the like as the method of increasing the melt viscosity of the resin. Moreover, the melt viscosity means a melt viscosity at a pressure shaping temperature, for example, 190°–210° C.

In the invention, when the thermoplastic resin constituting the web is polypropylene, it is desirable that polypropylene having a melt viscosity higher than that of the above polypropylene in the heating and compression shaping is used as the film A. In this case, the value of melt flow index (MFR, measuring conditions; according to JIS K6758) of polypropylene constituting the film A is not more than 20 (g/10 minutes), preferably not more than 10 (g/10 minutes).

2. Film B: a two-layer film constructed with a first resin layer having the same structure as the film A and a second resin layer made from a resin having a melting point lower than that of the thermoplastic resin constituting the web.

In the first resin layer constituting the film B is used the same resin as the film A, which acts as mentioned above. The second resin layer constituting the film B is a film layer useful when the skin having no adhesiveness is used, and contributes to improve the adhesiveness between the skin and the substrate through anchor effect by entering fibers side the skin in the shaping. Therefore, when the thermoplastic resin constituting the web is polypropylene, it is desirable to use polypropylene having a melting point lower than the above polypropylene, or polyethylene. As the other resin constituting the second resin layer, there is preferably used a hot melt film made from polyamide, modified polyolefin, urethane or the like.

3. Film C: a two-layer film constructed with a first resin made from a resin having the same or similar structure as that of the thermoplastic resin constituting the web, preferably a resin having a melt viscosity equal to or more than that of the thermoplastic resin in the heating and shaping under compression and a second resin layer made from a resin having a melting point higher than that of the thermoplastic resin constituting the web.

The second resin layer constituting the film C forms a non-permeable layer without melting after the heating and shaping under compression and acts to more improve the non-permeability of the light weight stampable sheet shaped body. However, it is desirable to be a resin film giving an elongation to an extent of not obstructing the shapability to the sheet in the expansion shaping. As the resin of the second resin layer, it is desirable to be a resin having a melting point higher than 10° C. of the melting point of the thermoplastic resin constituting the web. For example, use may be made of polyolefinic resins such as polyethylene, polypropylene and the like; polystyrene, polyvinyl chloride, polyethylene terephthalate, polycarbonate, polyamide, polyacetal and copolymer composed mainly of these resins (e.g. ethylene-vinyl chloride copolymer, ethylene-vinyl acetate copolymer, styrene-butadiene-acrylonitrile copolymer and the like) and grafted product thereof; thermoplastic elastomers such as EPM, EPDM and the like; polymer alloy, or a blend of these resins. Particularly, when polypropylene is used as the thermoplastic resin constituting the web, it is favorable to use a resin not melting within a pressure shaping temperature range of web of 190°–210° C. (melting point is higher than 10° C. of that of polypropylene) such as polyamide resin.

4. Film D: a three-layer film constructed with a first resin made from a resin having the same or similar structure as that of the thermoplastic resin constituting the web, a second resin layer made from a resin having a melting point higher than that of the thermoplastic resin constituting the web and a third resin layer made from a resin having a melting point lower than that of the thermoplastic resin constituting the web.

The third resin layer constituting the film D is a film layer useful in case of using the skin having no adhesiveness and acts as an adhesion layer to the skin. For this purpose, it may be made from a resin having a melting point lower than that of the thermoplastic resin constituting the web and has no other restriction. For example, use may be made of polyolefinic resins such as polyethylene, polypropylene and the like; polystyrene, polyvinyl chloride, polyethylene terephthalate, polycarbonate, polyamide, polyacetal and copolymer composed mainly of these resins and grafted product thereof; thermoplastic elastomers such as EPM, EPDM and the like; polymer alloy, or a blend of these resins.

5. Film E: a single film layer made from a resin having the same or similar structure as that of the thermoplastic resin constituting the web.

The film E is locally impregnated between the web and the organic fiber nonwoven fabric in the heating and compression to form an impregnated layer having a sufficient thickness to the contact face between the web and the organic fiber nonwoven fabric as a layer of a sandwich structural body, which is a resin layer bearing the improvement of the rigidity and the improvement of the adhesiveness to the substrate through anchor effect.

Moreover, the above two-layer or three-layer film may be produced by the conventionally known method. For example, the formation of the multilayer film can be carried out by a dry laminate method or co-extrusion method.

Further, the above multilayer film may be produced by laminating each single layer constituting the multilayer film on the web and integrally uniting them under heating and compression in the production of the paper-made stampable sheet.

And also, it is possible to arrange a thin adhesion layer between the layers of the multi layer film for more improving the adhesiveness.

The method of producing the paper-made stampable sheet and the light weight stampable sheet shaped body according to the invention will be described below.

1. At first, the reinforcing fibers such as chopped strands of glass fibers and the particulate or fiber-shaped thermoplastic resin are dispersed in an aqueous solution of a surfactant containing dispersed fine bubbles of air. As the surfactant, sodium dodecylbenzene sulfonate and the like are preferably used, but they are not restricted.
2. Then, the resulting dispersion is dehydrated through a porous support to deposit solid content in the dispersion, which is dried to obtain a uniform web. The web is comprised of the reinforcing fibers, the thermoplastic resin and the like, in which the particles of the thermoplastic resin are uniformly dispersed in the reinforcing fibers. The thickness of the web is desirable to be 1–10 mm.
3. Next, a thermoplastic resin film or an organic fiber nonwoven fabric is laminated on one-side or both sides of the web. The laminate is heated to a temperature of not lower than a melting point of the thermoplastic resin but lower than a decomposition point thereof to fuse the resin and a pressure is applied between cooling plates to obtain a densely solidified paper-made stampable sheet.

When the thermoplastic resin is polypropylene, the temperature heating the web is 170°–230° C., preferably 190°–210° C. If the heating temperature is lower than 170° C., the fusion of the resin is insufficient to bring about the lowering of the strength, while when it exceeds 230° C., the coloration due to the decomposition and the lowering of the strength are caused. Further, the pressure between the cooling plates is desirable to be within a range of 3–50 kgf/cm² for obtaining the dense paper-made stampable sheet. When the pressure exceeds 50 kgf/cm², the breakage of the reinforcing fiber such as glass fiber or the like is apt to be caused, while when the pressure is less than 3 kgf/cm², the wetting of the reinforcing fibers such as glass fibers or the like with the thermoplastic resin is insufficient and the lowering of the strength is apt to be caused.

Moreover, the paper-made stampable sheet may be compounded with additives such as antioxidant, light stabilizing agent, metal deactivating agent, flame retardant, carbon black, magnesium silicate and the like, a coloring agent and so on. These additives and coloring agent may be included into the paper-made stampable sheet by previously including them with the particulate thermoplastic resin or coating thereonto, or a method of adding through spraying or the like in the production step of the paper-made stampable sheet.

4. The thus made paper-made stampable sheet (laminated sheet) is reheated to a temperature above the melting point of the constituting resin, and a skin is laminated on the expanded sheet in case of a skin stuck product, and then placed in a shaping mold. The height of a mold spacer, the clamping height of press and the like are adjusted, and thereafter the paper-made stampable sheet is integrally united by shaping under pressure to obtain a light weight stampable sheet shaped body having given thickness and density.

The heating temperature in the expansion shaping may be properly selected within a temperature range of not lower than the melting point of the thermoplastic resin constituting the paper-made stampable sheet but lower than the decomposition point thereof. For example, when the thermoplastic resin is polypropylene, the heating temperature is 170°–250° C., preferably 190°–210° C. The heating method for the paper-made stampable sheet is not particularly restricted, but is a platen heating, a far-infrared ray heating, a ventilation heating or the like. Further, the mold temperature may be not higher than a solidification point of the thermoplastic resin and is usually within a range of room temperature to 60° C. from a viewpoint of handling property and productivity. And also, the shaping pressure differs in accordance with the product shape, but is usually a range of 1–50 kg/cm² because the excessive pressure breaks the reinforcing fibers.

The density of the thus obtained light weight stampable sheet shaped body is controlled by a clearance of the mold and is smaller than a theoretical density ($\rho$), preferably not more than 0.8 g/cm³, more particularly not more than 0.7 g/cm³. Here, the theoretical density ($\rho$) is a density when the porosity is zero and is determined according to the following equation:

$$\rho = 100/(W_m/\rho_m + W_r/\rho_r)$$

$W_m$: weight fraction of thermoplastic resin
$W_r$: weight fraction of reinforcing fiber
$\rho_m$: density of thermoplastic resin
$\rho_r$: density of reinforcing fibers.

Further, the expansion magnification of the light weight stampable sheet shaped body is 1.1–15 times, preferably 1.5–10 times. When the expansion magnification is too large, if the applied amount is large, the temperature difference between surface and interior in the heating becomes large and uniform heating is difficult causing non-uniform thickness. While, when the expansion magnification is too small, the effect of weight reduction at the required thickness is less. The term "expansion magnification" used herein means a value obtained by dividing the thickness of the expanded body (light weight stampable sheet shaped body) by the theoretical thickness (thickness when the porosity is zero).

As mentioned above, in the method of producing the paper-made stampable sheet and the light weight stampable sheet shaped body, the invention particularly proposes a production method useful for obtaining light weight stampable sheet shaped bodies having improved adhesiveness between skin and substrate by expansion shaping of the paper-made stampable sheet as a starting material. According to this proposal, when the stampable sheet according to the invention is used as the starting material for the expansion shaping, there can be obtained the light weight stampable sheet shaped body improving not only the adhesiveness between skin and substrate but also the rigidity and non-permeability.

The production method of the light weight stampable sheet shaped body according to the invention will concretely be described with reference to FIG. 7–FIG. 14.

In the production method of the invention a pair of a female mold 5 and a male mold 6 are used, in which either one or both of these molds is provided with a press device and both the molds are openable.

1. In the invention, both the molds are first at an opened state and a skin 2 and a paper-made stampable sheet 10 expanded by heating (hereinafter referred to as a heated sheet simply) are arranged so as to pile one upon the other between the female and male molds. The heating of the paper-made stampable sheet according to the invention means that it is heated at a temperature of not lower than a melting point of the thermoplastic resin but lower than a decomposition point thereof.

In this case, the heated sheet 10 may directly be placed on the surface of the lower mold (male mold in the figure) and the skin 2 may directly be placed thereon, or an end of the heated sheet 10 is held by a stretchable clamp frame 8 for the paper-made stampable sheet disposed on the outer periphery of the male mold and an end of the skin 2 may be held by a clamp frame 7 for the skin capable of holding at a parting face of an upper mold (female mold in the figure) or their holdings may be carried out by both frames, respectively.

Particularly, in case of producing the shaped body of a complicated form, it is preferable that the skin 2 and the heated sheet 10 are held by the respective clamp frames 7, 8 and the holding force and sliding in the clamping are adjusted at respective positions in accordance with their forms.

Figure 7:
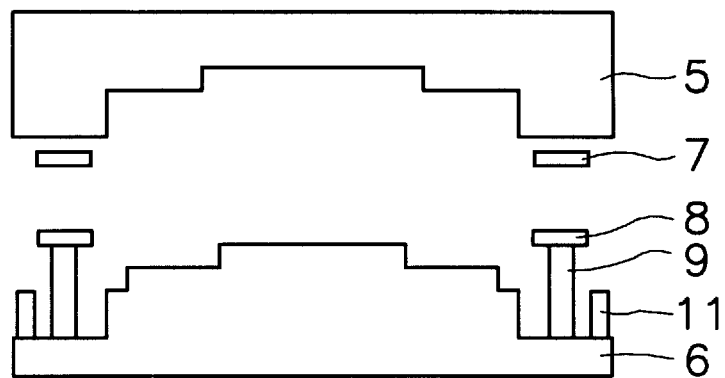
FIG. 7 is an outline view illustrating a section of a shaping mold used in the invention.

In FIG. 7 is shown a section of an outline of molds in case of arranging both of the clamp frame 7 for the skin and the clamp frame 8 for the paper-made stampable sheet, which has a structure that the clamp frame 9 for the paper-made stampable sheet works together with a sliding device 9 capable of expanding and contracting in opening and closing directions of the mold. Further, if the clamp frame 7 for the skin may be held at the parting face of the female mold, the structure of the frame is optional and an adhesion tape or the like may be taken simply.

Figure 8:
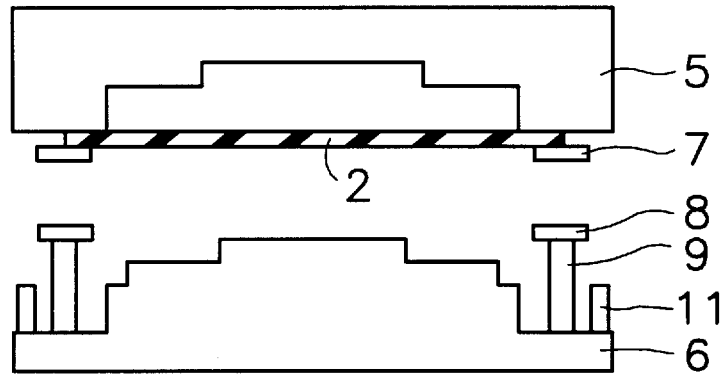
FIG. 8 to FIG. 10 are outline views of mold sections illustrating production steps of the light weight stampable sheet shaped body according to the invention.
Figure 9:
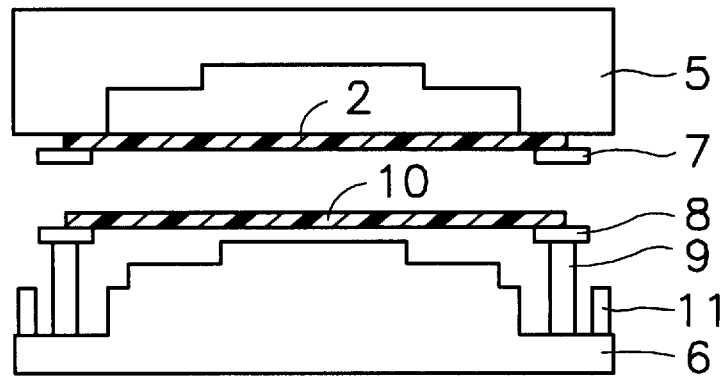
Figure 10:
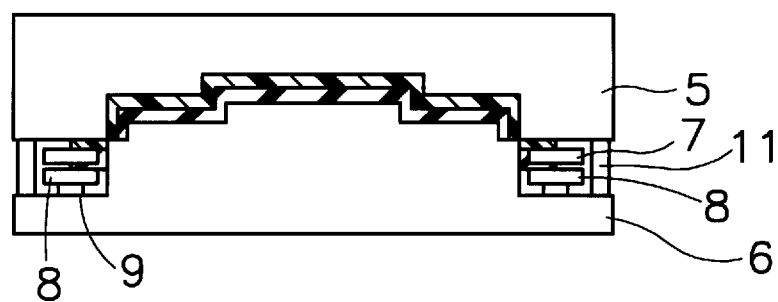
Figure 11:
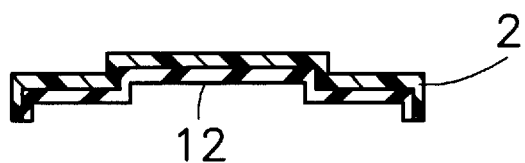
FIG. 11 is an outline view illustrating the section of the resulting light weight stampable sheet shaped body.

As the skin and the heated sheet are supplied to a space between the molds, if the clamp frame 7 for the skin is not disposed, the supply of the heated sheet is naturally preferential, while if the clamp frame 7 for the skin is disposed, it is general that, as shown in FIG. 8, the skin is supplied prior to the supply of the heated sheet and held by the clamp frame 7 for the skin in order to prevent the cooling of the heated sheet before the shaping as far as possible.

In the former case, it is possible that the skin is placed on the heated sheet outside the mold and then supplied between the molds as they are.

The heating of the paper-made stampable sheet as a shaping material differs in accordance with kinds of the reinforcing fibers constituting the sheet and thermoplastic resin as a matrix resin and the like. When the heating temperature is too low, the sufficient expandability is not obtained and the adhesiveness to the skin is poor, so that it is necessary to conduct the heating at least above the melting point of the matrix resin.

However, when the heating temperature is too high, the thermal deterioration of the matrix resin is caused and also the handling is difficult. For example, when the glass fibers are used as the reinforcing fiber and polypropylene is used as the matrix resin, the heating temperature is usually about 170°–230° C.

2. After the heated sheet and skin are supplied between the molds (see FIG. 9), the clamping is started and then completed at a position that the thickness of the heated sheet is 40–80% (see FIG. 10).

The completion of the clamping is carried out by an optional method among methods of controlling a clamping completion position of a press machine fixed to the mold and the like. But it is favorable to use a method of surely conducting with a stopper 11 previously set to a given position without requiring an expensive control device.

3. After the completion of the clamping, the molds are cooled and then opened to take out a shaped body in which a sheet expanded from the paper-made stampable sheet as a shaping material by at least 2 times (hereinafter referred to as an expansion sheet 12) is rendered into a substrate layer and the skin is integrally and strongly bonded to the surface thereof (see FIG. 11).

Thus, there is produced the shaped body obtained by integrally and strongly bonding the skin to the surface of the expansion sheet 12. In this case, when the skin has a net-shaped structure such as nonwoven fabric or the like, the adhesiveness is more improved through anchor effect, while when the skin is made from the same or similar material as the matrix resin of the paper-made stampable sheet, the skin is directly heat-fused to the surface of the sheet, so that the adhesion effect is more excellent. In the invention, it is preferable to use such a skin.

Furthermore, good adhesiveness and rigidity are obtained by using the paper-made stampable sheet expanding to not less than 5 times in the heating.

Moreover, according to the invention, it is very effective to use a skin laminated at its back surface with a thermoplastic resin layer fused by the heat of the heated sheet (hereinafter referred to as a fusion resin layer 13) in order to more improve the adhesiveness between the skin and the substrate even in case of using any skin.

In this case, the fusion resin layer may be laminated on the back surface of the skin with an adhesive or the like, or may be laminated by fusion process.

As another method, the expansion shaping may be carried out by interposing a thermoplastic resin film F(13) fused by the heat of the heated sheet (hereinafter referred to as fusible film) between the skin and the heated sheet. In this case, the fusible film F(13) may be placed on the heated sheet and further the skin may be placed thereon, or the fusible film F(13) is simply piled on the back surface of the skin without lamination, which are placed on the heated sheet as they are. In any case, the fusible sheet F(13) is melted between the skin and the substrate by heat of the heated sheet in the expansion shaping and heat-fused thereto, whereby both are more strongly adhered to each other through the fusible film F(13).

Figure 12:
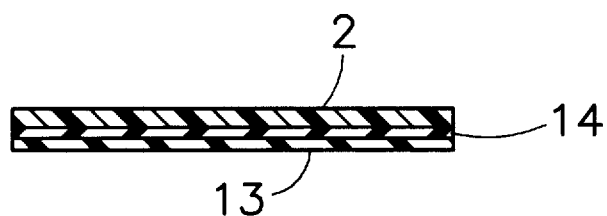
FIG. 12 is a schematically sectional view illustrating an embodiment of the skin used in the production method according to the invention.

In the shaped body obtained by the above methods, when the woven fabric, nonwoven fabric or the like having a permeability is used as the skin, the shaped body itself has a permeability. Even when using the skin having such a permeability, as shown in FIG. 12, a thermoplastic resin layer 14 not fused by the heat of the heated sheet is laminated on the back surface of the skin and further the fusion resin layer 13 is laminated on the outside thereof, whereby the skin layer is strongly heat-fused to the substrate through the fusion resin layer to more improve the adhesion force.

Even in this case, the expansion shaping may be carried out by using the skin laminated at its back surface with the thermoplastic resin layer 14 not fused by the heat of the heated sheet and interposing the fusible film F(13) between such a skin and the heated sheet as above.

Figure 13:
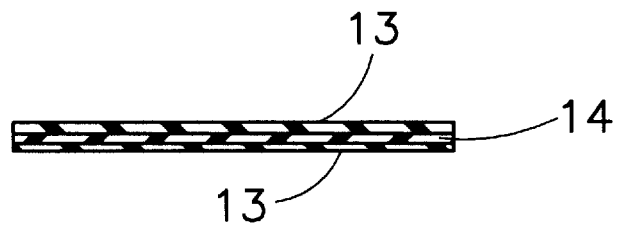
FIG. 13 and FIG. 14 are schematically sectional views of a sheet disposed between a skin and a heated sheet used in the production method according to the invention.

As another method, the similar effect can be obtained even by using a film of three-layer structure, in which fusion resin layers 13 are laminated on both surfaces of the thermoplastic resin layer 14 not fused by the heat of the heated sheet as a middle layer and interposing such a three-layer sheet between the skin and the heated sheet to conduct expansion shaping as shown in FIG. 13.

In this case, it is not required to previously laminate the thermoplastic resin layer 14 not fused by the heat of the heated sheet on the back surface of the skin, and the skin 2 and the substrate are simultaneously bonded to both surfaces of the resin layer 14 as a middle layer through the fusion resin layer 13 in the expansion shaping.

In any one of the methods, the skin 2 and the expansion sheet 12 are strongly adhered trough the fusion resin layer 13 and also the thermoplastic resin layer 14 not fused by the heat of the heated sheet is left between the expansion sheet and the skin as it is, whereby the nonpermeable effect can be obtained. Further, the thermoplastic resin layer is formed on the surface of the resulting expansion sheet as a substrate, so that there is also obtained an effect of improving the strength.

In these methods, it is favorable that the thermoplastic resin in the fusion resin layer fused by the heat of the heated sheet or the fusible film F(13) is a thermoplastic resin having a melting temperature lower by 20°–80° C. than a surface temperature of the heated sheet for easily fusing by heat of the heated sheet in the expansion shaping.

Although the above describes an example of conducting the expansion shaping using the three-layer structure film (wherein the fusion resin layers 13 are laminated onto both surfaces of the thermoplastic resin layer 14 not fused by the heat of the heated sheet as a middle layer) and interposing such a three-layer film between the skin and the heated sheet, the same effect as described above can be obtained by another method. That is, an expansion shaping in which a film obtained by laminating a resin layer 15 (made from a thermoplastic resin having a melting temperature lower by 10°–50° C. than that of the thermoplastic resin forming the film) on one-side surface of the fusion resin layer 13 (made from the thermoplastic resin having a melting temperature lower by 20°–80° C. than a surface temperature of the heated sheet) by adjusting the thickness of the fusion resin layer used, and then the resin layer 15 and the fusion resin layer 13 are supplied between the skin and the heated sheet so as to locate the resin layer 15 on the side of the skin and the fusion resin layer 13 on the side of the heated sheet.

This method utilizes a heat gradient in the thickness of the sheet. When the fusion resin layer 13 contacts the heated sheet, a surface portion of the fusion resin layer (located on the side of the heated sheet) is melted by the heat of the heated sheet and becomes strongly heat-fused to the substrate. While a surface portion of the fusion resin layer (located on the side of the resin layer 15) is not itself melted, as the resin layer 15 contacted therewith has a low melting temperature, resin layer 15 is melted and heat-fuses the skin and the fusible film. Hence, the skin and the substrate are strongly bonded while leaving a part of the fusion resin layer 13 as it is to form a resin layer.

Figure 14:
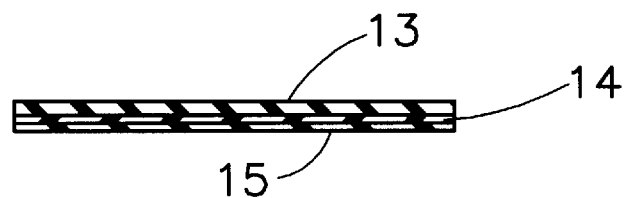

As a method similar to the above, the same effect as mentioned above can be obtained by expansion shaping using a three-layer film wherein the three-layer film is obtained by laminating the fusion resin layer 13 (made from a thermoplastic resin having a melting temperature lower by 20°–80° C. than a surface temperature of the heated sheet) onto one surface of the thermoplastic resin layer 14 not fused by the heat of the heated sheet, and the resin layer 15 (made from a thermoplastic resin having a melting temperature lower by 10°–50° C. than that of the thermoplastic resin forming the film) onto the other surface thereof. The resulting three-layer film is supplied between the skin and the heated sheet so as to locate the resin layer 15 on the side of the skin and the fusion resin layer 13 on the side of the heated sheet as shown in FIG. 14.

The thickness of each of the films used herein is properly selected to an optimum thickness in accordance with the aforementioned purposes or by considering a contacting time between the heated sheet and the skin or the like, but it is usually not more than 150 μm.

Further, the material of these films varies in accordance with the heating temperature of the paper-made stampable sheet as a shaping material, but is selected from the films having the above temperature properties in accordance with the respective conditions.

Thus, there are light weight stampable sheet shaped bodies having high porosity, excellent weight reduction, high strength and strong adhesion of skin, and also the non-permeability may properly be provided, if necessary.

Moreover, there is a case that the reinforcing fibers constituting the substrate may rise up on the surface of the light weight stampable sheet shaped body opposite to the surface provided with the skin. In order to prevent such a rise, it is very effective to use as the shaping material a paper-made stampable sheet previously subjected to a treatment for preventing the rise of the fibers on one surface thereof.

The treatment for preventing the rise of the fiber can easily be carried out by laminating, for example, a non-woven fabric, a thermoplastic film or the like on the one side of the paper-made stampable sheet. In the production of the paper-made stampable sheet, it is general that such a treatment is carried out by heating and pressing the nonwoven material, uniformly dispersing the reinforcing fibers and the thermoplastic resin powder together with the nonwoven fabric or the thermoplastic film.

The nonwoven fabric or thermoplastic film used in the prevention of fiber rise is not particularly restricted, but polyester nonwoven fabric having a weight of about 10–50 g/m$^2$ or the like is preferably used as the nonwoven fabric. Further, the thermoplastic resin film is not particularly restricted as far as the film is not fused or broken in the heating of the paper-made stampable sheet for carrying out the expansion shaping according to the invention, and may be the same as the aforementioned thermoplastic resin layer 14 not fused by the heat of the skin or heated sheet.

Especially, when the thermoplastic resin film is used for preventing the rise of the fiber, the non-permeable layer is formed on the substrate. In particular, when the thermoplastic resin layer 14 not fused by the heat of the heated sheet is also on the side of the skin, the nonpermeable layers are formed on both surfaces of the substrate, whereby the shaped body having excellent air insulation property can be obtained.

As mentioned above, according to the production method of the invention, the light weight stampable sheet shaped body provided with the skin strongly adhered and having excellent weight reduction and rigidity is easily obtained, and also the substrate layer may easily be rendered into the nonpermeable structure. As a result, it is possible for the resulting shaped body to be widely used in various applications, particularly interior components for automobiles such as the ceiling member, door trim and the like as a shaped product being light in the weight and high in the rigidity and having excellent adhesiveness between the skin and the substrate and nonpermeability.

An example of using the light weight stampable sheet shaped body according to the invention as a shock absorbing member such a door trim or the like will be described concretely with respect to FIG. 15 to FIG. 21.

Figure 15:
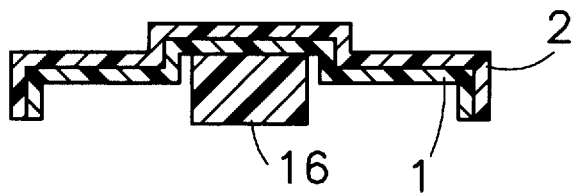
FIG. 15 and FIG. 16 are outline views illustrating a sectional structure of an embodiment of the light weight stampable sheet shaped body as a shock absorbing member according to the invention.
Figure 16:
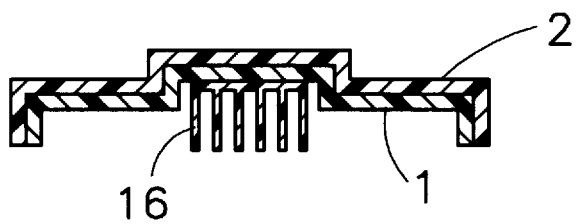
Figure 17:
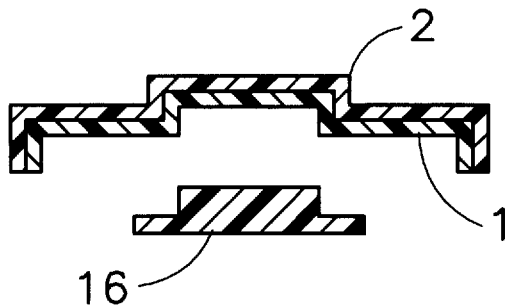
FIG. 17 and FIG. 18 are sectional views illustrating states before and after adhesion between substrate and shock absorbing body, respectively.
Figure 18:
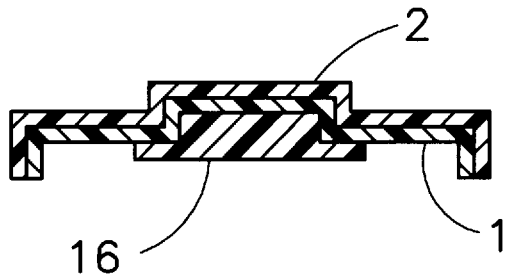

FIG. 15 shows a sectional view of an embodiment of the light weight stampable sheet shaped body according to the invention, which is comprised of a substrate 1 made from fiber reinforced thermoplastic resin layer having a porosity of not less than 50% and a skin 2 provided on its design side surface and a shock absorbing member 16 made from a thermoplastic resin foamed body or the like partially arranged on the non-design face. FIG. 16 shows another embodiment of the light weight stampable sheet shaped body according to the invention, in which a rib made from a thermoplastic resin as a shock absorbing member 16 is integrally united with the substrate 1.

In the light weight stampable sheet shaped body as a shock absorbing product according to the invention, the substrate is necessary to be a fiber reinforced thermoplastic resin layer having a porosity of not less than 50% from a viewpoint of the strength and weight reduction. This resin layer can easily be obtained from the paper-made stampable sheet according to the invention made through paper-making process. That is, the resin layer can easily be produced by rendering the paper-made stampable sheet into a desired form through expanding under heating in a thickness direction so as to have a desired porosity, or by an expansion shaping method in which the sheet is expanded under heating in the thickness direction so as to have a porosity above a given porosity and again shaped under pressure compression while holding the heated state to provide desired porosity and desired shape. In general, the latter expansion shaping method is adopted in view of the good shapability.

Particularly, in case of using the paper-made stampable sheet adhered at one side with the thermoplastic resin film, the skin is usually adhered to the side not adhered with the film, and the shock absorbing member is disposed on the side adhered with the film. According to this structure, the nonpermeability is imparted to the substrate through the film, while the rise of the fibers on the surface not provided with the skin can be prevented.

Further, in case of using the paper-made stampable sheet adhered at both surfaces with the thermoplastic resin films, the rise of the reinforcing fibers on the non-design surface of the substrate is prevented and the adhesiveness between the skin and the substrate is improved. Further, the rigidity of the substrate is improved so that there is the effect of more improving the rigidity of the light weight stampable sheet shaped body as the resulting shock absorbing product.

The thermoplastic resin film may be laminated with the paper-made stampable sheet through heating under pressure in the expansion shaping at the laminated state of the substrate and the sheet.

Moreover, the treatment for preventing the rise of the reinforcing fibers can be carried out by laminating a nonwoven fabric such as polyester nonwoven fabric having a weight of about 10–50 g/m$^2$ on the side of the substrate not provided with the skin in addition to the lamination of the above resin film.

The skin may be adhered to the previously shaped substrate with an adhesive or the like, but it is favorable that the skin is integrally united with the substrate at the same time of shaping in the production step of the light weight stampable sheet shaped body through the expansion shaping of the paper-made stampable sheet. In this case, the skin needs to have a heat resistance so as not to fuse or break by heat at the heating step in the expansion shaping. In the latter case, it is preferable that the skin is a material having a good adhesiveness through heat fusion to the substrate such as a thermoplastic resin being the same or similar to the matrix resin of the paper-made stampable sheet as a substrate or the thermoplastic resin film adhered onto the surface of the sheet. When the skin itself is poor in the adhesiveness to the matrix resin or the thermoplastic resin film, the adhesiveness can be improved by previously laminating the back surface of the skin with a resin film having an excellent adhesiveness to these resins.

Furthermore, the adhesion can be attained in accordance with the kind or thickness of the skin through an anchor effect of entering the reinforcing fibers rising on the surface of the substrate into the thermoplastic resin layer constituting the skin, or through an anchor effect of the matrix resin in the substrate when the woven fabric or knitted fabric as the skin is porous or the surface of the skin is fibrous.

If the nonpermeability is required in the light weight stampable sheet shaped body, the non-permeable skin is used. If this skin is excellent in the adhesiveness to the substrate, it is not particularly required to previously adhere the thermoplastic resin film on either or both surfaces of the substrate. In the case of using the permeable skin, the paper-made stampable sheet adhered with the thermoplastic resin film is used, or the skin laminated at its back surface with the non-permeable film may be used.

The light weight stampable sheet shaped body as a shock absorbing member according to the invention is formed by adhering the above skin 2 on the design face of the substrate 1 and laminating and uniting the shock absorbing body 16 on at least part of the non-design face as a back surface of the substrate.

The material of the shock absorbing body is selected from various conventionally known shock absorbing materials in accordance with use purposes, but a fiber reinforced thermoplastic resin shaped body having a porosity of not less than 65 volume %, a thermoplastic resin foamed body having closed cells or a rib structural body made from a thermoplastic resin is preferably used.

The fiber reinforced thermoplastic resin shaped body having a porosity of not less than 65% can easily be produced according to the production of the paper-made stampable sheet applied to the invention. It may be made from a material being same as or different from the paper-made stampable sheet constituting the substrate and naturally has a different thickness. The constituting material and thickness are properly determined so as to satisfy the given shock absorbability.

As the thermoplastic resin foamed body having closed cells, conventionally well-known foamed bodies are used as they are, but polypropylene bead foamed body having rich weight reduction and high shock absorbability is preferably used.

Further, the shock absorbing body made from the thermoplastic resin shaped body is usually used as a columnar or hollow rib structural body, which is used in a case that the shock absorbing product serves as an interior member for automobile such as door trim or the like.

Such a shock absorbing body may be arranged over a full non-design surface or back surface of the substrate not adhered with the skin, but is usually arranged on a part of the back surface. The shape, size, arranging position, arranging number, and the like of the shock absorbing product are properly determined in accordance with use purpose, use condition, and the like and are not particularly restricted.

For example, the form of the shock absorbing body may take a most effective form and size considering the weight reduction, shock absorbability, fitness to the other part, shapability and the like. The form may be block, pipe, unevenness, comb or the like.

As the integral uniting of the shock absorbing body with the substrate, the shock absorbing body previously shaped into a desired form may be adhered to the shaped substrate with an adhesive or through heat fusion, or when the heat fusability between the shock absorbing body and the substrate is excellent, the shock absorbing body may be integrally united with the substrate during the shaping of the substrate. The latter method is advantageous in view of the cost.

In case of using the shock absorbing body of rib structure, the rib structural body previously shaped into the desired form may be adhered after the shaping of the substrate, or it may be integrally united at the same time of substrate shaping.

Further, the substrate adhered with the skin is shaped by using a mold designed so as to provide the desired form of the shock absorbing product, and thereafter the rib portion is formed by supplying the molten thermoplastic resin to a ribforming portion of the mold and may simultaneously be united with the former formed substrate.

The light weight stampable sheet shaped body as the shock absorbing product according to the invention can easily be produced by laminating the skin on the design face side of the paper-made stampable sheet as a substrate and laminating and integrally uniting the shock absorbing body on at least a part of the non-design face side thereof according to the aforementioned optional method. Preferably, the skin is desirable to be laminated and adhered to the design face of the substrate at the same time of at least substrate shaping.

According to this method, there is utilized a method of adhering the skin at the same time of the expansion shaping of the paper-made stampable sheet. In this case, the porosity of the paper-made stampable sheet itself is not so important, but the porosity when the sheet is heated and expanded above the melting temperature of the matrix resin, may be not less than 50 volume %, preferably 80 volume %.

A typical production example in the above method will be described below.

One of the methods is a method of integrally uniting the substrate and the previously formed shock absorbing body at separate steps.

In this method, a pair of upper mold 5 and lower mold 6 having cavity faces of a steric form corresponding to the form of the desired light weight stampable sheet shaped body other than the shock absorbing body (see FIG. 7) are used. A skin 2 and a paper-made stampable sheet 10 previously expanded under heating above the melting temperature of the matrix resin in a far-infrared ray heating furnace or the like and having a porosity of not less than 50 volume % are supplied between both molds at an opened state so as to pile one upon the other (see FIG. 9). Thereafter, both the molds are clamped to a desired thickness while maintaining the porosity of the sheet above 50 volume % to adhere and integrally unite the skin and the sheet with each other utilizing heat of the sheet 10 and clamping pressure and render a substrate 1 made from the sheet into a desired form (see FIG. 10). After cooling, the substrate provided with the skin is taken out (see FIG. 11) and adhered and integrally united with a separately formed shock absorbing body 16 through an adhesive or the like at a given position of the substrate (see FIG. 17 and FIG. 18).

Another method is a method of integrally uniting the substrate and the previously formed shock absorbing body at one step.

According to this method, a pair of upper mold 5 and lower mold 6 having cavity faces of a steric form corresponding to the form of the desired light weight stampable sheet shaped body (see FIG. 19) are used. At an opened state of both the molds, the shock absorbing body 16 is housed in a concave portion of the mold cavity face housing the shock absorbing body, and the paper-made stampable sheet 10 previously expanded under heating above the melting temperature of the matrix resin in a far-infrared ray heating furnace or the like to have a porosity of not less than 50 volume % and the skin 2 are piled one upon the other thereon (see FIG. 20). Thereafter, both the molds are clamped to a desired thickness while holding the porosity of the sheet at not less than 50 volume % to adhere and integrally unite the skin and the sheet utilizing heat of the sheet 10-and the clamping pressure and render the substrate 1 made from the sheet into a desired form and the shock absorbing body 16 is simultaneously united with the substrate 1 through heat of the sheet 10 (see FIG. 21).

Among these methods, the latter method is advantageous in industry and will be described in detail below.

The mold used in this method is a pair of upper mold 5 and lower mold 6 as mentioned above, either or both of these molds are movable in up and down directions.

The cavity faces of these molds are rendered into a steric form corresponding to the form of the light weight stampable sheet shaped body as a product.

In this case, the concave portion of mold face of the lower mold formed in correspondence with the form of the shock absorbing body has an opening equal to or somewhat larger than the adhesion face of the shock absorbing body to the substrate.

In the first shaping step, both the molds are first rendered into an opened state and the shock absorbing body having a previously shaped form is housed in the concave portion formed in the face of the lower mold corresponding to the form of the shock absorbing body. In this case, it is favorable that an upper end face of the shock absorbing body (adhesion face to the substrate) is set so as to be equal to or somewhat higher than the cavity face of the lower mold.

Furthermore, when the shock absorbing body is made from a material having a poor adhesiveness to the substrate through heat, the adhesion face of the shock absorbing body to the substrate is required to be previously subjected to a proper treatment such as sticking of thermoplastic resin film (hot melt film) capable of adhering through heat or coating of hot melt adhesive so as to adhere and integrally unite with the heated paper-made stampable sheet 10 through heat.

After the housing of the shock absorbing body, the paper-made stampable sheet 10 previously expanded under heating above the melting temperature of the matrix resin in a far-infrared ray heating furnace or the like and having a porosity of not less than 50 volume % and the skin 2 are supplied so as to cover the shock absorbing body. In this case, it is favorable that the resin sheet 10 has a porosity of not less than 80 volume % by heating. This resin sheet 10 may directly be placed on the face of the lower mold, or may be placed at a floating state from the mold face by holding the sheet ends with clamping frames and the like. Furthermore, the skin may be supplied so as to directly pile on the resin sheet 10, or may be supplied at a distance separated from the resin sheet by holding end portions of the skin with a parting face of the upper mold or clamping frames for the skin.

Moreover, it is possible that the previously shaped skin is used and set on the surface of the upper mold.

After the shock absorbing body 16, the paper-made stampable sheet 10 expanded by heating and the skin 2 are supplied between both the molds, the clamping is carried out to a desired product thickness so as not to make the porosity of the resin sheet not less than 50 volume %, whereby the sheet as the substrate is shaped into a given form and at the same time the skin 2 and the shock absorbing body 16 are adhered and integrally united by heat of the heated sheet and the clamping pressure.

In the clamping, a method of setting the cavity clearance at the completion of the clamping by a stopper 11 arranged in the mold is simple and sure and favorable in industry.

After the completion of the clamping, the molds are cooled and opened to take out a product therefrom.

Thus, there is easily produced a light weight stampable sheet shaped body in which the fiber reinforced thermoplastic resin layer having a porosity of not less than 50 volume % is used as a substrate and is adhered at its design-side surface with the skin and united at its back surface with the shock absorbing body.

In these production methods, even when the thermoplastic resin film is previously adhered to one-side surface or both surfaces of the paper-made stampable sheet as a starting material, the sheet is heated at the film-adhered state so as to have a porosity of not less than 50 volume %, which may be supplied between the molds.

When the shock absorbing body is a rib structure of the thermoplastic resin, the concave portion of the mold is rendered into a form corresponding to the rib form and the substrate adhered with the skin is first shaped in the same manner as described above without housing the shock absorbing body in the concave portion, and then molten resin is supplied from a supply port of the molten resin passing through a molten resin passage formed in the inside of the mold and opening in the concave portion at the clamped state and then the molds are cooled, whereby there can be obtained the light weight stampable sheet shaped body as a shock absorbing product in which the rib of the thermoplastic resin is strongly united with the substrate.

In the light weight stampable sheet shaped body as a shock absorbing product according to the invention as mentioned above, not only the shock absorbing body but also the substrate itself are made from the fiber reinforced thermoplastic resin layer having a high porosity, so that the shock absorbability is very excellent and the appearance is good owing to the adhesion of the skin and hence the shaped body itself may be used as an interior member or the like. Further, it has many effects that the rigidity, adhesiveness to skin, non-permeability and weight reduction are excellent.

EXAMPLES

The invention will concretely be described with reference to examples below. Moreover, the thermoplastic resin and reinforcing fibers constituting the paper-made stampable sheet, the organic fiber nonwoven fabric, single and multilayer film, and the skin used in these examples are as follows, but they are not intended as limitations thereof.

Thermoplastic resin
    Polypropylene particle A: homopolypropylene (melting point: 162° C., MFR: 65 g/10 min)
    Polypropylene particle B: polypropylene (melting point: 130° C.)
    Polypropylene fiber A: homopolypropylene (average fiber length: 10 mm, average fiber diameter: 30 $\mu$m)
    Polypropylene fiber B: modified polypropylene (average fiber length: 10 mm, average fiber diameter: 30 $\mu$m)

Reinforcing fiber
    Glass fiber A: chopped strand (length: 25 mm, diameter: 13 $\mu$m)
    Glass fiber B: chopped strand (length: 25 mm, diameter: 17 $\mu$m)

Organic fiber nonwoven fabric
    Oorganic fiber nonwoven fabric A: polyester fiber spun bond (weight: 50 g/m$^2$, thickness: 0.45 mm)
    Organic fiber nonwoven fabric B: polyester fiber spun bond (weight: 18 g/m$^2$, thickness: 0.16 mm)

Film
    Film A1: polypropylene (MFR: 0.6 g/10 min, melting point: 145° C.) of 60 $\mu$m in thickness blended with 10% of low-density polyethylene LDPE
    Film A2: polypropylene (MFR: 1.0 g/10 min, melting point: 162° C.) of 60 $\mu$m in thickness filled with 5% of titanium oxide
    Film B1: two-layer film formed by dry lamination process, in which a first layer is polypropylene (MFR: 4.0 g/10 min, melting point: 162° C.) of 60 $\mu$m in thickness and a second layer is polypropylene (MFR: 12 g/10 min, melting point: 130° C.) of 40 $\mu$m in thickness
    Film C1: two-layer film formed by dry lamination process, in which a first layer is polyethylene (MFR: 15 g/10 min, melting point: 115° C.) of 60 $\mu$m in thickness and a second layer is 6-nylon (melting point: 215° C.) of 25 $\mu$m in thickness
    Film C2: two-layer film formed by dry lamination process, in which a first layer is polyethylene (MFR: 15 g/10 min, melting point: 115° C.) of 60 $\mu$m in thickness and a second layer is polyethylene terephthalate (melting point: 230° C.) of 25 $\mu$m in thickness
    Film C3: two-layer film formed by dry lamination process, in which a first layer is polypropylene (MFR: 4 g/10 min, melting point: 155° C.) of 60 $\mu$m in thickness and a second layer is 6-nylon (melting point: 215° C.) of 25 $\mu$m in thickness
    Film D1: three-layer film formed by dry lamination process, in which a first layer is polyethylene (MFR: 15 g/10 min, melting point: 115° C.) of 60 $\mu$m in thickness and a second layer is 6-nylon (melting point: 215° C.) of 25 $\mu$m in thickness and a third layer is polyethylene (MFR: 15 g/10 min, melting point: 115° C.) of 40 $\mu$m in thickness
    Film D2: three-layer film formed by dry lamination process, in which a first layer is polypropylene (MFR: 4 g/10 min, melting point: 155° C.) of 60 $\mu$m in thickness and a second layer is 6-nylon (melting point: 215° C.) of 25 $\mu$m in thickness and a third layer is polyethylene (MFR: 15 g/10 min, melting point: 115° C.) of 40 $\mu$m in thickness
    Film D3: three-layer film formed by dry lamination process, in which a first layer is polypropylene (MFR: 4 g/10 min, melting point: 155° C.) of 60 μm in thickness and a second layer is 6-nylon (melting point: 215° C.) of 25 μm in thickness and a third layer is modified olefinic hot melt (melting point: 100° C.) of 40 μm in thickness Film E1: polypropylene (MFR: 9 g/10 min, melting point: 162° C.) of 60 μm in thickness Film F1: polypropylene (MFR: 9 g/10 min, melting point: 155° C.) of 60 μm in thickness Film F2: polypropylene (MFR: 9 g/10 min, melting point: 130° C.) of 40 μm in thickness Film G1: 6-nylon (melting point: 215° C.) of 25 μm in thickness Moreover, MFR of polypropylene is a value measured at 230° C. and 2.16 kgf according to JIS K6785, and MFR of polyethylene is a value measured at 190° C. and 2.16 kgf according to JIS K6760.

Skin

Skin A: polyester organic fiber nonwoven fabric (thickness: 2 mm) provided with backing material and hot melt layer Skin B: polyester organic fiber nonwoven fabric (thickness: 2 mm) provided with backing material but not provided with hot melt layer (Example 1)

A web is obtained by mixing and paper-making 25% of polypropylene particle A, 25% of polypropylene fiber A, 25% of glass fiber A and 25% of glass fiber B based on dry weight to have a total weight of 600 g/m². The resulting web is heated to 210° C., and the heated web is placed between cooling plates of 25° C. and pressed at a pressure of 5 kgf/cm² to obtain a densely solidified paper-made stampable sheet.

The paper-made stampable sheet is heated at a heater setting temperature of 250° C. by means of a far-infrared ray heater for 2 minutes and then the resulting expanded stampable sheet is compressed and cooled by molds having a clearance set to 2 mm to obtain a light weight stampable sheet shaped body (see FIG. 1).

The expansion magnification of the substrate in this shaped body (ratio of actual substrate thickness to theoretical thickness at a porosity of zero) is about 4 times. A test piece of 150 mm in length and 50 mm in width is cut out from the shaped body and subjected to a three-point bending test at a span of 100 mm and a crosshead speed of 50 mm/min under loading to measure maximum load and elastic gradient. Further, the permeable test is carried out according to ASTMD737 to evaluate a permeability. The results are shown in Table 1.

(Example 2)

A web is obtained by mixing and paper-making 50% of polypropylene fiber A, 25% of glass fiber A and 25% of glass fiber B based on dry weight to have a total weight of 600 g/m². The resulting web is heated to 210° C., and the heated web is placed between cooling plates of 25° C. and pressed at a pressure of 5 kgf/cm² to obtain a densely solidified paper-made stampable sheet.

The paper-made stampable sheet is heated at a heater setting temperature of 250° C. by means of a far-infrared ray heater for 2 minutes and then the resulting expanded stampable sheet is compressed and cooled by molds having a clearance set to 2 mm to obtain a light weight stampable sheet shaped body (see FIG. 1).

The expansion magnification of the substrate in this shaped body is about 4 times. The maximum load, elastic gradient and permeability are measured in the same manner as in Example 1 with respect to the resulting shaped body. The results are shown in Table 1.

(Example 3)

A web is obtained by mixing and paper-making 30% of polypropylene fiber A, 20% of polypropylene fiber B, 25% of glass fiber A and 25% of glass fiber B based on dry weight to have a total weight of 600 g/m². The resulting web is heated to 210° C., and the heated web is placed between cooling plates of 25° C. and pressed at a pressure of 5 kgf/cm² to obtain a densely solidified paper-made stampable sheet.

The paper-made stampable sheet is heated at a heater setting temperature of 250° C. by means of a far-infrared ray heater for 2 minutes and then the resulting expanded stampable sheet is compressed and cooled by molds having a clearance set to 2 mm to obtain a light weight stampable sheet shaped body (see FIG. 1).

The expansion magnification of the substrate in this shaped body is about 4 times. The maximum load, elastic gradient and permeability are measured in the same manner as in Example 1 with respect to the resulting shaped body. The results are shown in Table 1.

(Comparative Example 1)

A web is obtained by mixing and paper-making 50% of polypropylene particle A, 25% of glass fiber A and 25% of glass fiber B based on dry weight to have a total weight of 600 g/m². The resulting web is heated to 210° C., and the heated web is placed between cooling plates of 25° C. and pressed at a pressure of 5 kgf/cm² to obtain a densely solidified paper-made stampable sheet.

The paper-made stampable sheet is heated at a heater setting temperature of 250° C. by means of a far-infrared ray heater for 2 minutes and then the resulting expanded stampable sheet is compressed and cooled by molds having a clearance set to 2 mm to obtain a light weight stampable sheet shaped body (see FIG. 1).

The expansion magnification of the substrate in this shaped body is about 4 times. The maximum load, elastic gradient and permeability are measured in the same manner as in Example 1 with respect to the resulting shaped body. The results are shown in Table 1.

(Example 4)

A web is obtained by mixing and paper-making 50% of polypropylene particle A, 25% of glass fiber A and 25% of glass fiber B based on dry weight so as to have a total weight of 600 g/m². After film A1 is laminated on the web, they are heated to 210° C. and the heated film and web are placed between cooled plates of 25° C. and pressed at a pressure of 5 kgf/cm² to obtain a densely solidified paper-made stampable sheet.

Figure 2:
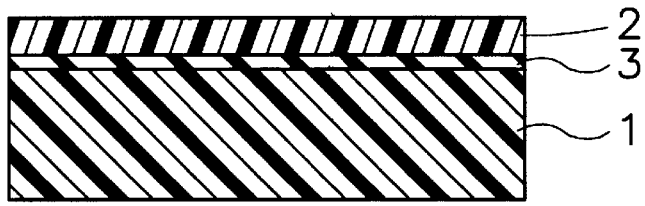

The paper-made stampable sheet is heated at a heater setting temperature of 250° C. by means of a far-infrared ray heater for 2 minutes, and then a skin A (provided with hot melt layer) is placed on the film A1 of the sheet expanded under heating. The substrate is compressed together with the skin in molds having a clearance set to 4 mm, which is cooled to obtain a light weight stampable sheet shaped body provided with the skin (see FIG. 2). In this case, the expansion magnification of the substrate in the shaped body provided with the skin is about 4 times. A test piece of 150 mm in length and 50 mm in width is cut out from the skin-stuck shaped body and subjected to a three-point bending test at a span of 100 mm and a crosshead speed of 50 mm/min under loading from the skin side to measure a maximum load. Further, the permeable test is carried out according to ASTMD737 to evaluate the permeability. Moreover, a piece of 150 mm in length and 25 mm in width for peeling test (T-peel test) is cut out and subjected to usual tensile test (tensile rate: 50 mm/min) at an opened state of 50 mm from the end to measure a peel strength as an average value of maximum load and minimum load. These results are shown in Table 1.

(Example 5)

The same procedure as in Example 4 is repeated except that film A2 is used instead of the film A1 in Example 4 to obtain a skin stuck light weight stampable sheet shaped body.

The expansion magnification of the substrate in the skin stuck shaped body is about 4 times. The maximum load, elastic gradient, peel strength and permeability are measured with respect to the resulting shaped body in the same manner as in Example 4. The results are shown in Table 1.

(Example 6)

A web is obtained by mixing and paper-making 50% of polypropylene particle A, 25% of glass fiber A and 25% of glass fiber B based on dry weight so as to have a total weight of 600 g/m$^2$. After film B1 is laminated on the web so as to face the first layer to the web, they are heated to 210° C. and the heated film and web are placed between cooled plates of 25° C. and pressed at a pressure of 5 kgf/cm$^2$ to obtain a densely solidified paper-made stampable sheet.

The paper-made stampable sheet is heated at a heater setting temperature of 250° C. by means of a far-infrared ray heater for 2 minutes, and then a skin B (not provided with hot melt layer) is placed on the film B1 of the sheet expanded under heating. The substrate is compressed together with the skin in molds having a clearance set to 4 mm, which is cooled to obtain a light weight stampable sheet shaped body provided with the skin (see FIG. 2).

The expansion magnification of the substrate in the skin stuck shaped body is about 4 times. The maximum load, elastic gradient, peel strength and permeability are measured with respect to the resulting shaped body in the same manner as in Example 4. The results are shown in Table 1.

(Example 7)

A web is obtained by mixing and paper-making 50% of polypropylene particle A, 25% of glass fiber A and 25% of glass fiber B based on dry weight so as to have a total weight of 600 g/m$^2$. After film C1 is laminated on the web so as to face the first layer to the web, they are heated to 210° C. and the heated film and web are placed between cooled plates of 25° C. and pressed at a pressure of 5 kgf/cm$^2$ to obtain a densely solidified paper-made stampable sheet.

The paper-made stampable sheet is heated at a heater setting temperature of 250° C. by means of a far-infrared ray heater for 2 minutes, and then a skin A (provided with hot melt layer) is placed on the film C1 of the sheet expanded under heating. The substrate is compressed together with the skin in molds having a clearance set to 4 mm, which is cooled to obtain a light weight stampable sheet shaped body provided with the skin (see FIG. 2).

The expansion magnification of the substrate in the skin stuck shaped body is about 4 times. The maximum load, elastic gradient, peel strength and permeability are measured with respect to the resulting shaped body in the same manner as in Example 4. The results are shown in Table 1.

(Example 8)

The same procedure as in Example 7 is repeated except that film C2 is used instead of the film C1 in Example 7 to obtain a skin stuck light weight stampable sheet shaped body.

The expansion magnification of the substrate in the skin stuck shaped body is about 4 times. The maximum load, elastic gradient, peel strength and permeability are measured with respect to the resulting shaped body in the same manner as in Example 4. The results are shown in Table 1.

(Example 9)

The same procedure as in Example 7 is repeated except that film C3 is used instead of the film C1 in Example 7 to obtain a skin stuck light weight stampable sheet shaped body.

The expansion magnification of the substrate in the skin stuck shaped body is about 4 times. The maximum load, elastic gradient, peel strength and permeability are measured with respect to the resulting shaped body in the same manner as in Example 4. The results are shown in Table 1.

(Example 10)

The same procedure as in Example 6 is repeated except that film D1 is used instead of the film B1 in Example 6 to obtain a skin stuck light weight stampable sheet shaped body.

The expansion magnification of the substrate in the skin stuck shaped body is about 4 times. The maximum load, elastic gradient, peel strength and permeability are measured with respect to the resulting shaped body in the same manner as in Example 4. The results are shown in Table 1.

(Example 11)

The same procedure as in Example 10 is repeated except that film D2 is used instead of the film D1 in Example 10 to obtain a skin stuck light weight stampable sheet shaped body.

The expansion magnification of the substrate in the skin stuck shaped body is about 4 times. The maximum load, elastic gradient, peel strength and permeability are measured with respect to the resulting shaped body in the same manner as in Example 4. The results are shown in Table 1.

(Example 12)

The same procedure as in Example 10 is repeated except that film D3 is used instead of the film D1 in Example 10 to obtain a skin stuck light weight stampable sheet shaped body.

The expansion magnification of the substrate in the skin stuck shaped body is about 4 times. The maximum load, elastic gradient, peel strength and permeability are measured with respect to the resulting shaped body in the same manner as in Example 4. The results are shown in Table 1.

(Example 13)

The same procedure as in Example 11 is repeated except that the ratio of 45% of glass fiber A and 5% of glass fiber B is used instead of the glass fiber ratio in Example 11 to obtain a skin stuck light weight stampable sheet shaped body.

The expansion magnification of the substrate in the skin stuck shaped body is about 4 times. The maximum load, elastic gradient, peel strength and permeability are measured with respect to the resulting shaped body in the same manner as in Example 4. The results are shown in Table 1.

(Example 14)

The same procedure as in Example 11 is repeated except that the ratio of 5% of glass fiber A and 45% of glass fiber B is used instead of the glass fiber ratio in Example 11 to obtain a skin stuck light weight stampable sheet shaped body.

The expansion magnification of the substrate in the skin stuck shaped body is about 4 times. The maximum load, elastic gradient, peel strength and permeability are measured with respect to the resulting shaped body in the same manner as in Example 4. The results are shown in Table 1.

(Example 15)

The same procedure as in Example 12 is repeated except that polypropylene particle B is used instead of polypropylene particle A in Example 12 to obtain a skin stuck light weight stampable sheet shaped body.

The expansion magnification of the substrate in the skin stuck shaped body is about 4 times. The maximum load, elastic gradient, peel strength and permeability are measured with respect to the resulting shaped body in the same manner as in Example 4. The results are shown in Table 1.

(Example 16)

A web is obtained by mixing and paper-making 50% of polypropylene particle A, 25% of glass fiber A and 25% of glass fiber B based on dry weight so as to have a total weight of 600 g/m². Organic fiber nonwoven fabrics A are laminated on both surfaces of the web. The laminate is heated to 210° C. and the heated laminate is placed between cooled plates of 25° C. and pressed at a pressure of 5 kgf/cm² to obtain a densely solidified paper-made stampable sheet.

Figure 3:
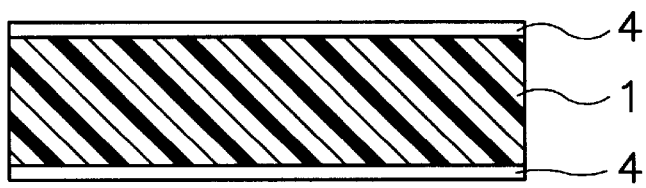

The paper-made stampable sheet is heated at a heater setting temperature of 250° C. by means of a far-infrared ray heater for 2 minutes, and then the expanded stampable sheet is compressed in molds having a clearance set to 4 mm, which is cooled to obtain a light weight stampable sheet shaped body provided with the skin (see FIG. 3).

The expansion magnification of the substrate is about 4 times. The maximum load, elastic gradient, and permeability are measured with respect to the resulting shaped body in the same manner as in Example 1. The results are shown in Table 1.

(Example 17)

Figure 4:
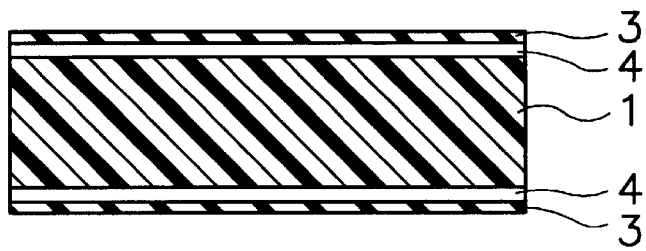

The same procedure as in Example 16 is repeated except that organic fiber nonwoven fabric A and film A1 are laminated on both surfaces of the web obtained in Example 16 so as to render the film A1 into an outermost layer to obtain a light weight stampable sheet shaped body provided with the skin (see FIG. 4).

The expansion magnification of the substrate is about 4 times. The maximum load, elastic gradient, and permeability are measured with respect to the resulting shaped body in the same manner as in Example 1. The results are shown in Table 1.

(Example 18)

Figure 5:
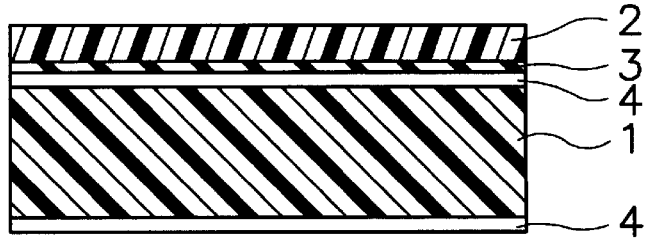

The same procedure as in Example 16 is repeated except that organic fiber nonwoven fabric A and organic fiber nonwoven fabric B are laminated on both surfaces of the web obtained in Example 16 and film B1 is laminated on the organic fiber nonwoven fabric A located on one surface so as to face the first layer of the film to the web side to obtain a light weight stampable sheet shaped body. After the same heating as in Example 16, skin B is placed on the film B1 of the sheet expanded under heating and the substrate is compressed together with the skin B in molds having a clearance set to 4 mm, which is cooled to obtain a light weight stampable sheet shaped body provided with the skin (see FIG. 5).

The expansion magnification of the substrate is about 4 times. The maximum load, elastic gradient, peel strength and permeability are measured with respect to the resulting shaped body in the same manner as in Example 4. The results are shown in Table 1.

(Example 19)

The same procedure as in Example 18 is repeated except that film C1 is laminated instead of the film B1 in Example 18 to obtain a light weight stampable sheet shaped body. After the same heating as in Example 18, skin B is placed on the film C1 of the sheet expanded under heating and the substrate is compressed together with the skin B in molds having a clearance set to 4 mm, which is cooled to obtain a light weight stampable sheet shaped body provided with the skin.

The expansion magnification of the substrate is about 4 times. The maximum load, elastic gradient, peel strength and permeability are measured with respect to the resulting shaped body in the same manner as in Example 4. The results are shown in Table 1.

(Example 20)

Figure 6:
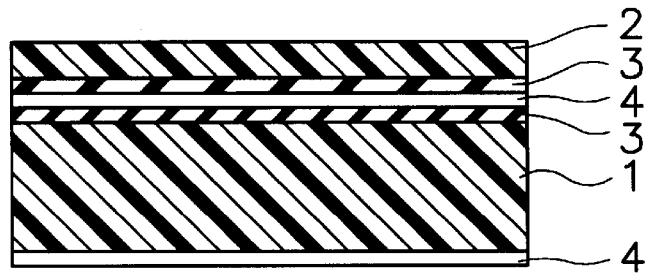

The same procedure as in Example 16 is repeated except that organic fiber nonwoven fabrics A are laminated on both surfaces of the web obtained in Example 16 and film E1 is interposed between the one-side surface of the organic fiber nonwoven fabric A and the web to obtain a light weight stampable sheet shaped body. After the same heating as in Example 16, skin A is placed on the organic fiber nonwoven fabric A of the sheet expanded under heating and the substrate is compressed together with the skin A in molds having a clearance set to 4 mm, which is cooled to obtain a light weight stampable sheet shaped body provided with the skin (see FIG. 6).

The expansion magnification of the substrate is about 4 times. The maximum load, elastic gradient, peel strength and permeability are measured with respect to the resulting shaped body in the same manner as in Example 4. The results are shown in Table 1.

TABLE 1

|   | Maximum load (kgf) | Elastic gradient (kgf/mm) | Permeating amount (cc/cm² sec) | Peel strength (kgf/cm) |
|---|---|---|---|---|
| 1 | 1.4 | 1.9 | Not less than 500 | — |
| 2 | 1.6 | 2.1 | Not less than 500 | — |
| 3 | 1.7 | 2.4 | Not less than 500 | — |
| 4 | 1.5 | 2.1 | 2.5 | 0.40 |
| 5 | 1.5 | 2.0 | 3.4 | 0.57 |
| 6 | 1.6 | 1.9 | 0.2 | 0.35 |
| 7 | 1.6 | 2.1 | 0.0 | 0.40 |
| 8 | 1.8 | 2.3 | 0.0 | 0.61 |
| 9 | 1.8 | 2.2 | 0.0 | 0.63 |

TABLE 1-continued

|  |  | Maximum load (kgf) | Elastic gradient (kgf/mm) | Permeating amount (cc/cm² sec) | Peel strength (kgf/cm) |
|---|---|---|---|---|---|
| Example | 10 | 1.9 | 2.3 | 0.0 | 0.55 |
|  | 11 | 2.2 | 2.6 | 0.0 | 0.71 |
|  | 12 | 2.1 | 2.4 | 0.0 | 0.95 |
|  | 13 | 2.3 | 2.8 | 0.0 | 0.20 |
|  | 14 | 1.7 | 2.1 | 0.0 | 0.93 |
|  | 15 | 1.4 | 1.9 | 0.0 | 0.71 |
|  | 16 | 2.0 | 2.4 | Not less than 500 | — |
|  | 17 | 2.2 | 2.6 | 0.5 | — |
|  | 18 | 1.6 | 2.8 | 0.1 | 0.85 |
|  | 19 | 2.6 | 3.1 | 0.0 | 1.05 |
|  | 20 | 2.1 | 2.7 | 0.7 | 0.42 |
| Comparative Example | 1 | 1.2 | 1.7 | Not less than 500 | — |

As seen from the results of Examples 1–3 and Comparative Example 1 shown in Table 1, the light weight stampable sheet shaped bodies according to the invention using fibrous polypropylene as a thermoplastic resin constituting the web are excellent in the maximum load and elastic gradient as compared with the light weight stampable sheet shaped body of the comparative example. From this, it is apparent that the rigidity is improved by mixing the fibrous thermoplastic resin. Particularly, the effect becomes conspicuous by mixing a modified product.

As seen from the results of Examples 4–15 shown in Table 1, in the light weight stampable sheet shaped body according to the invention, at least one of the rigidity, non-permeability and adhesiveness between substrate and skin can be improved by properly selecting single or multi-layer thermoplastic resin film to be laminated on the surface of the substrate. Particularly, it has been confirmed that the complete non-permeability can be realized when the film having a melting point higher than that of the thermoplastic resin constituting the web remains on the surface of the substrate or between the substrate and the skin. Moreover, the thermoplastic resin film forms a smooth surface at the face contacting with the skin, so that the adhesion to the skin is facilitated. Further, when the thermoplastic resin film provided with a resin layer having a low melting point is used at the side of the skin, the impregnated adhesive layer is formed even to the skin not provided with hot melt, so that it has been found that good adhesion state is exhibited by anchor effect.

As seen from the results of Examples 16–20 shown in Table 1, in the light weight stampable sheet shaped body according to the invention, the higher rigidity can be developed when the organic fiber nonwoven fabric having a melting point higher than that of polypropylene constituting the substrate is existent on the surface of the substrate alone or at a state of sandwich structure laminated on its surface layer with the thermoplastic resin film. Particularly, it has been confirmed that the complete non-permeability can be realized when the film having a melting point higher than that of the thermoplastic resin constituting the web remains on the surface of the substrate or between the substrate and the skin.

(Example 21)

Figure 19:
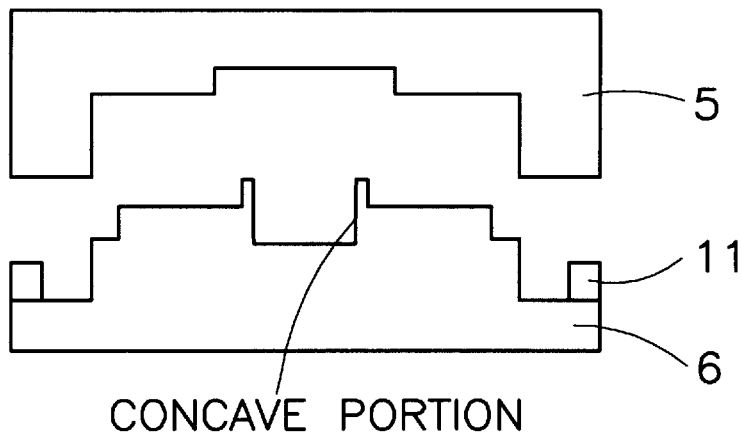
FIG. 19 is a schematically sectional view of an embodiment of the mold producing the light weight stampable sheet shaped body as a shock absorbing member according to the invention.

A light weight stampable sheet shaped body as a shock absorbing product is produced by the following methods using a pair of upper and lower molds as shown in FIG. 19 in which a face of the lower mold has a concave portion housing a shock absorbing body.

Moreover, skin A is used as a skin and a solidified sheet obtained by mixing and paper-making 50% of polypropylene particle A, 25% of glass fiber A and 25% of glass fiber B based on dry weight so as to have a total weight of 1200 g/m², heating the resulting web to 210° C., placing the heated laminate between cooled plates of 25° C. and pressing at a pressure of 5 kgf/cm² is used as a paper-made stampable sheet. Further, the shock absorbing body is used by expanding the above paper-made stampable sheet through heat, cooling it to form a light weight stampable sheet shaped body having a porosity of 80 volume % (thickness: 15 mm) and cutting it into a given form, and a hot melt adhesive sheet is laminated on the adhesion face of the shock absorbing body to the substrate.

As shown in FIG. 19, both the upper and lower molds are opened and the shock absorbing body is fitted into the concave portion of the lower mold so that the upper face of the body to be adhered to the substrate has a height equal to the cavity face of the mold.

In this case, the stopper is set so that the clearance of the shaped face in the completion of the clamping is 5 mm.

Figure 20:
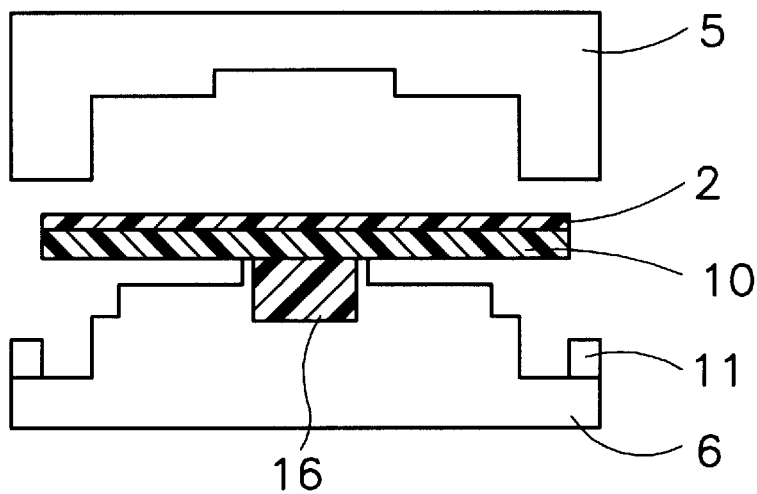
FIG. 20 and FIG. 21 are schematically sectional views of the mold illustrating the production step as a production example of the light weight stampable sheet shaped body as a shock absorbing member according to the invention.
Figure 21:
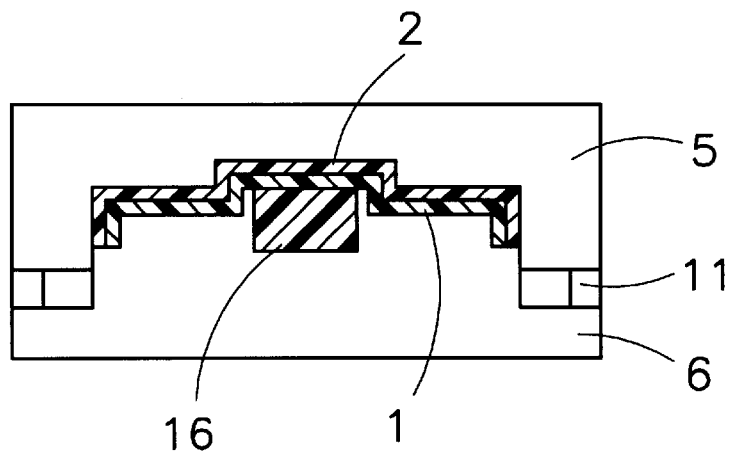

Then, the expanded sheet having a porosity of 83 volume % and a thickness of 6 mm obtained by heating the paper-made stampable sheet to 210° C. in a far-infrared ray heating furnace is placed thereon and further the laminated sheet as a skin is placed thereon (see FIG. 20).

Thereafter, the upper mold is immediately descended downward to start the clamping, and then the clamping is completed at a cavity clearance of 5 mm.

After the molds are cooled at this state, the molds are opened to obtain a light weight stampable sheet shaped body as a shock absorbing product having a sectional form shown in FIG. 15.

The substrate in the resulting light weight stampable sheet shaped body has a porosity of 60 volume %, and is strongly united at one surface with the skin comprised of the laminated sheet and at its back surface with the expanded shock absorbing body having a porosity of 80 volume % and hence the appearance is good. Furthermore, it is light in the weight and very excellent in the rigidity and shock absorbability.

(Example 22)

A skin A is fixed by using a pair of female and male molds provided with a clamping frame for skin, a clamping frame for paper-made stampable sheet and a stopper as shown in FIG. 7 (see FIG. 8).

A web is obtained by mixing and paper-making 50% of polypropylene particle A, 25% of glass fiber A and 25% of glass fiber B based on dry weight so as to have a total weight of 1200 g/m². The thus obtained web is heated to 210° C. and the heated laminate is placed between cooled plates of 25° C. and pressed at a pressure of 5 kgf/cm² to obtain a densely solidified paper-made stampable sheet.

The paper-made stampable sheet is heated at a heater setting temperature of 250° C. in a far-infrared ray heater for 3 minutes to expand to 6 times of theoretical thickness. In this case, the surface temperature of the expanded sheet is 210° C. Then, the expanded sheet is placed on the clamping frame for the paper-made stampable sheet (see FIG. 9), and the female mold is immediately descended to conduct the clamping until the descending is stopped by the stopper (see FIG. 10). In this case, the stopper is set so that the clearance of the shaped face in the completion of the clamping is 4.8 mm. After the clamping, the molds are cooled and opened to take out the shaped body, whereby there is obtained a light weight stampable sheet shaped body provided with the skin (see FIG. 11).

The expansion magnification of the substrate in the resulting shaped body is 3 times (compressed to 50% of the thickness of the heated paper-made stampable sheet), and the adhesiveness between the stampable sheet as a substrate and the skin is good and the rigidity of the shaped body is sufficient.

(Example 23)

The same procedure as in Example 22 is repeated except that the clearance is 6.5 mm to obtain a light weight stampable sheet shaped body provided with the skin. In this case, the expansion magnification is 4.8 times (compressed to 80% of the thickness of the heated paper-made stampable sheet), and the adhesiveness between the stampable sheet as a substrate and the skin is good and the rigidity of the shaped body is sufficient.

(Example 24)

The same procedure as in Example 22 is repeated except that a skin having a thickness of 2 mm is formed by laminating two-layer film through dry lamination process comprised of polypropylene film F1 fusing by heat of the heated stampable sheet and nylon film G1 not fusing by heat of the heated stampable sheet to a back surface of polyester nonwoven fabric so as to locate the polypropylene film outward and the clearance of the shaped face in the completion of the clamping is 6 mm, whereby there is obtained a light weight stampable sheet shaped body provided with the skin.

The expansion magnification of the substrate in the resulting shaped body is 4.5 times (compressed to 75% of the thickness of the heated paper-made stampable sheet), and the adhesiveness between the stampable sheet as a substrate and the skin is good and the rigidity of the shaped body is sufficient.

(Example 25)

The same procedure as in Example 22 is repeated except that three-layer film through dry lamination process comprised of polypropylene film F1 as a first layer, 6-nylon film G1 as a second layer and polypropylene film F2 as a third layer is piled on a nonwoven fabric so as to locate the polypropylene film F2 of the third layer side the nonwoven fabric and fixed between the parting face of the female mold and the clamping frame for the skin and the clearance of the shaped face in the completion of the clamping is 4.2 mm, whereby there is obtained a light weight stampable sheet shaped body provided with the skin.

The expansion magnification of the substrate in the resulting shaped body is 2.3 times (compressed to 45% of the thickness of the heated paper-made stampable sheet), and the adhesiveness between the stampable sheet as a substrate and the skin is good and the rigidity of the shaped body is sufficient.

(Comparative Example 2)

The same procedure as in Example 22 is repeated except that the clearance in Example 22 is changed to 7.4 mm to obtain a light weight stampable sheet shaped body.

The expansion magnification of the substrate in the resulting shaped body is 5.7 times (compressed to 95% of the thickness of the heated paper-made stampable sheet), and the rigidity of the shaped body is sufficient, but the adhesiveness between the stampable sheet as a substrate and the skin is insufficient.

(Comparative Example 3)

The same procedure as in Example 22 is repeated except that the clearance in Example 22 is changed to 3.7 mm to obtain a light weight stampable sheet shaped body.

The expansion magnification of the substrate in the resulting shaped body is 1.8 times (compressed to 30% of the thickness of the heated paper-made stampable sheet), and the adhesiveness between the stampable sheet as a substrate and the skin is good, but-the rigidity of the shaped body is low and also the falling-down of the nonwoven fabric is observed.

INDUSTRIAL APPLICABILITY

As mentioned above, according to the invention, there can be provided a paper-made stampable sheet having a high rigidity and, if necessary, improved adhesiveness and non-permeability, whereby there can easily be obtained a light weight stampable sheet shaped body having a high rigidity and an excellent non-permeability as well as a skin-stuck light weight stampable sheet shaped body having excellent adhesiveness between substrate and skin and high rigidity and complete non-permeability irrespectively of the adhesiveness of the skin.

Therefore, the light weight stampable sheet shaped body according to the invention can advantageously be applied to wide fields requiring high rigidity and weight reduction such as automobile interior members, e.g. ceiling member, door trim and the like, household electric goods, building materials and so on.

We claim:

1. A stampable sheet formed by a process comprising the steps of:

paper-making a mixture of a thermoplastic resin and reinforcing fibers to obtain a sheet-like web;

piling a multilayer film on at least one surface of said web, wherein said multilayer film is comprised of a layer of a thermoplastic resin film having a melt viscosity during compression shaping under heating larger than that of the thermoplastic resin constituting the web and at least one layer of a thermoplastic resin film having excellent non-permeability and adhesiveness;

compressing them under a temperature above the melting point of said thermoplastic resin; and cooling and solidifying in a compressed state.

2. A stampable sheet according to claim 1, wherein said reinforcing fibers are comprised of at least two kinds of glass fibers having different fiber sizes, in an amount satisfying the equation $W1/(W1+W2)$ is 0.3–0.7 wherein W1 is an amount of small-size fibers added by wt. % and W2 is an amount of large-size fibers added by wt. %.

3. A stampable sheet according to claim 1, wherein said multilayer film is a two-layer film comprised of a first resin layer and a second resin layer, said first resin layer is comprised of a thermoplastic resin having a melt viscosity in the compression shaping under heating larger than that of the thermoplastic resin constituting the web, said second resin layer is comprised of a resin having a higher melting point than that of the thermoplastic resin constituting the web, provided that the first resin layer abuts a surface of said web.

4. A stampable sheet according to claim 1, wherein said multilayer film is a three-layer film comprised of a first resin layer, a second resin layer, and a third resin layer, said first resin layer is comprised of a thermoplastic resin having a melt viscosity during compression shaping under heating larger than that of the thermoplastic resin constituting the web, said second resin layer is comprised of a resin having higher melting point than that of the thermoplastic resin constituting the web, said third resin layer is comprised of a resin having a lower melting point than that of the thermoplastic resin constituting the web, and wherein the first resin layer abuts a surface of said web.

5. A stampable sheet according to claim 3 or 4, wherein said thermoplastic resin is polypropylene, said polypropylene having a melting point of at least 135° C. and wherein said second resin layer is comprised of a resin having a melting point higher than that of said polypropylene by more than 10° C.

6. A stampable sheet according to claim 3 or 4, wherein said second resin layer is comprised of a resin selected from the group consisting of a polyamide resin and a polyester resin.

7. A stampable sheet according to claim 4 wherein said thermoplastic resin constituting the web is polypropylene, said polypropylene having a melting point of at least 135° C. and said third resin layer is comprised of a resin selected from the group consisting of polypropylene and polyethylene, said resin having a lower melting point than that of the thermoplastic resin constituting the web.

8. A stampable sheet according to claim 4, wherein said thermoplastic resin constituting the web is polypropylene, said polypropylene having a melting point of at least 135° C. and said third resin layer comprised of a resin having a melting point lower than that of said polypropylene, thereby forming a hot melt layer.

9. A stampable sheet according to claim 3 or 4, wherein said thermoplastic resin constituting the web is polypropylene, said polypropylene having a melting point of at least 135° C. and wherein said first resin layer is comprised of a polyolefinic resin or a modified resin thereof, and wherein said first resin layer has a melt flow rate of 10 or less.

10. A stampable sheet according to claim 3 or 4, wherein said melt viscosity of said first resin layer is made higher than that of said thermoplastic resin constituting the web by including a filler in said first resin layer.

11. A stampable sheet according to claim 1, wherein an organic fiber non-woven fabric made from a resin having a melting point higher than that of said thermoplastic resin constituting the web is interposed between said web and said multilayer film.

12. A stampable sheet according to claim 11, wherein said thermoplastic resin constituting the web is polypropylene, said polypropylene having a melting point of at least 135° C. and wherein said resin constituting the organic fiber non-woven fabric comprises a resin having a higher melting point than said polypropylene by more than 10° C.

13. A stampable sheet according to claim 11, wherein said organic fiber non-woven fabric is comprised of a resin selected from the group consisting of a polyamide resin and a polyester resin.

14. A stampable sheet according to claim 1, 3 or 4, wherein a surface of said web opposite to said multilayer film laminated surface is laminated with only a layer of an organic fiber non-woven fabric, said organic fiber non-woven fabric having a higher melting point than that of said thermoplastic resin constituting the web.

15. A light weight stampable sheet shaped body formed by expanding the stampable sheet defined in claim 1, 3 or 4 under heating, thereby forming an expansion sheet, and compression shaping said expansion sheet so as to decrease the density of said body after compression shaping to a value lower than the density, wherein said density is measured at a porosity of zero percent.

16. A light weight stampable sheet shaped body provided with a skin formed by expanding the stampable sheet defined in claim 1, 3 or 4 under heating, thereby forming an expansion sheet, piling said expansion sheet on a skin thereby forming a layered pile, compression-shaping said layered pile so as to decrease the density of said body after said compression-shaping to a value lower than the density, wherein said density is measured at a porosity of zero percent.

17. A light weight stampable sheet shaped body according to claim 16, wherein the porosity of a portion of said body other than said skin is 50% or more.

18. A light weight stampable sheet shaped body according to claim 17, wherein said shaped body has a design face an a non-design face, wherein a shock absorbing body is arranged on at least a part of a non-design face of said shaped body, and wherein said non-design face is not provided with the skin.

19. A light weight stampable sheet shaped body according to claim 18, wherein said shock absorbing body is a fiber reinforced thermoplastic resin shaped body having a porosity of 65% or more.

20. A light weight stampable sheet shaped body according to claim 18, wherein said shock absorbing body is a thermoplastic resin foamed body having closed cells.

21. A light weight stampable sheet shaped body according to claim 18, wherein said shock absorbing body is a rib structural body made from a thermoplastic resin.

22. A method of producing a light weight stampable sheet shaped body, comprising the steps of:
 expanding the stampable sheet defined in claim 1 under heating to form an expansion sheet;
 supplying the expansion sheet and a skin between a pair of opened female and male molds wherein said expansion sheet and said skin are arranged in a pile;
 clamping said pile so that an expansion thickness of said expanded stampable sheet is 40–80%; and
 compressing said pile in said molds; and integrally uniting said expansion sheet with said skin.

23. The method according to claim 22, wherein said stampable sheet is a material expanding under heat to at least 5 times the theoretical thickness measured at a porosity of zero percent.

24. The method according to claim 22, wherein said skin is a composite skin, having a back layer and an outer layer, wherein said composite skin is obtained by laminating a thermoplastic resin layer on said back surface or said skin layer, wherein said thermoplastic resin layer is fused to said back surface of said skin by the surface temperature of said expanded stampable sheet.

25. The method according to claim 22, wherein a thermoplastic resin film fusible by the heat of a heated stampable sheet is interposed between said stampable sheet expanded under heating and said skin.

26. The method according to claim 22, wherein said skin, having a back surface and an outer surface, is formed into a composite skin by laminating a first thermoplastic resin layer not fusible by the surface temperature of said expanded stampable sheet to said back surface of said skin, laminating a second thermoplastic resin layer fusible by the surface temperature of said expanded stampable sheet on said first thermoplastic resin layer.

27. The method according to claim 22, wherein said skin having a back surface and an outer surface, is a composite skin obtained by laminating a thermoplastic resin layer not fusible by the surface temperature of said expanded stampable sheet on said back surface of said skin, and wherein a second thermoplastic resin layer, fusible by the surface temperature of the expanded stampable sheet is interposed between said skin and said stampable sheet.

28. The method according to claim 22, wherein said skin having a back surface and an outer surface, is a composite skin obtained by laminating a three-layer film on said back surface of said skin, wherein said three-layer film is comprised of a first layer, having a top surface and a bottom surface, comprised of a thermoplastic resin not fusible by the surface temperature of said expanded stampable sheet, and two second layers, comprised of a thermoplastic resin fusible by the surface temperature of said expanded stampable sheet, wherein one of said second layers is laminated to said top surface of said first layer, and the other said second layer is laminated to said bottom surface of said first layer.

29. The method according to claim 22, wherein said thermoplastic resin film interposed between said stampable sheet and said skin is a three-layer film, wherein said three-layered film is comprised of a first layer, having a top surface and a bottom surface, comprised of a thermoplastic resin not fusible by the surface temperature of said expanded stampable sheet, and two second layers, comprised of a thermoplastic resin fusible by the surface temperature of said expanded stampable sheet, wherein one of said second layers is laminated to said top surface of said first layer, and the other said second layer is laminated to said bottom surface of said first layer.

30. The method according to claims 24, 25, 26, 27, 28, or 29, wherein said thermoplastic resin fusible by the surface temperature of said expanded stampable sheet has a melting temperature of 20°–80° C. below said surface temperature of said expanded stampable sheet.

31. The method according to claim 22, wherein said second layers consist of a melt layer and a lower-melt layer, said lower-melt layer having a melting temperature of 20°–80° C. below said surface temperature of said expanded stampable sheet, said melt layer having a melting temperature of 10°–50° C. below said surface temperature of said expanded stampable sheet, and wherein said melt layer is laminated on said bottom surface of said first layer and said lower-melt layer is laminated on said top surface of said first layer, said top surface of said first layer faces said skin.

32. The method according to claim 22, wherein said stampable sheet is a composite stampable sheet comprised of a stampable sheet obtained by paper-making a mixture of a thermoplastic resin and reinforcing fibers to obtain a sheet like web, laminated with a thermoplastic resin sheet for preventing rise of fibers.

33. The method according to claim 22, wherein a heat fusible sheet for preventing rise of fibers in a stampable sheet previously is placed on a face of said molds that faces the stampable sheet.

34. The stampable sheet according to claim 1 wherein said thermoplastic resin film layer is a polypropylene, said polypropylene having a melting point of at least 135° C., wherein said film is comprised of a resin having substantially the same structure as said polypropylene, and wherein said film has a melt flow rate of 10 or less.

* * * * *

UNITED STATES PATENT AND TRADEMARK OFFICE
CERTIFICATE OF CORRECTION

PATENT NO.    : 5,854,149
DATED         : December 29, 1998
INVENTOR(S)   : Nagayama et al.

It is certified that error appears in the above-identified patent and that said Letters Patent is hereby corrected as shown below:

Column 3,
Line 29, please change "of skin" to -- skin --.

Column 4,
Line 20, please change "during the" to -- during --; and
Line 59, please change "used and" to -- used --.

Column 17,
Line 48, please change "frame 9" to -- frame 8 --.

Column 21,
Line 63, please change "the effect of more" to -- the effect of --.

Column 35,
Line 52, please change "2.3" to -- 2.7 --.

Signed and Sealed this

Eighteenth Day of March, 2003

JAMES E. ROGAN
*Director of the United States Patent and Trademark Office*